(12) United States Patent
Yakabe

(10) Patent No.: US 11,345,180 B2
(45) Date of Patent: May 31, 2022

(54) DISPLAY MEDIUM FOR ASSESSMENT AND METHOD FOR MANUFACTURING SAME

(71) Applicant: ZEON CORPORATION, Tokyo (JP)

(72) Inventor: Hiroshi Yakabe, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 100 days.

(21) Appl. No.: 16/326,262

(22) PCT Filed: Aug. 9, 2017

(86) PCT No.: PCT/JP2017/028969
§ 371 (c)(1),
(2) Date: Feb. 18, 2019

(87) PCT Pub. No.: WO2018/034215
PCT Pub. Date: Feb. 22, 2018

(65) Prior Publication Data
US 2019/0184732 A1 Jun. 20, 2019

(30) Foreign Application Priority Data
Aug. 19, 2016 (JP) .............................. JP2016-161463

(51) Int. Cl.
*B42D 25/364* (2014.01)
*B42D 25/373* (2014.01)
(Continued)

(52) U.S. Cl.
CPC ......... *B42D 25/364* (2014.10); *B42D 25/373* (2014.10); *B42D 25/40* (2014.10);
(Continued)

(58) Field of Classification Search
None
See application file for complete search history.

(56) References Cited

U.S. PATENT DOCUMENTS

| 4,728,547 A * | 3/1988 | Vaz .................... G02F 1/1334 |
| | | 252/299.66 |
| 5,593,617 A | 1/1997 | Kelly et al. |
| (Continued) | | |

FOREIGN PATENT DOCUMENTS

| CN | 104624124 A | 5/2015 |
| JP | S6270406 A | 3/1987 |
| (Continued) | | |

OTHER PUBLICATIONS

Ochai et al., JP2007-141117A machine translation via EPO website.*

(Continued)

*Primary Examiner* — Laura C Powers
(74) *Attorney, Agent, or Firm* — Kenja IP Law PC

(57) ABSTRACT

A display medium including a display layer for authenticity identification, wherein the display layer contains a droplet-cured product, and the droplet-cured product contains a resin having cholesteric regularity. The droplet-cured product preferably contains a cured product of a liquid crystal material containing a cholesteric liquid crystal compound. The display layer is preferably a cured product of a coating material containing the droplet-cured product. The display layer may contain plural types of droplet-cured products exhibiting different color tones as the droplet-cured product. The display layer may further contain a metal particle.

6 Claims, 2 Drawing Sheets

(51) Int. Cl.
  *B42D 25/40* (2014.01)
  *B42D 25/45* (2014.01)
  *G02B 5/30* (2006.01)
  *G02F 1/137* (2006.01)

(52) U.S. Cl.
  CPC .............. *B42D 25/45* (2014.10); *G02B 5/30* (2013.01); *G02B 5/3025* (2013.01); *G02F 1/13718* (2013.01)

(56) References Cited

U.S. PATENT DOCUMENTS

| | | |
|---|---|---|
| 6,180,028 B1 | 1/2001 | Hotaka et al. |
| 2002/0055555 A1 | 5/2002 | Kuntz et al. |
| 2003/0072893 A1 | 4/2003 | Nakano et al. |
| 2003/0219548 A1 | 11/2003 | Meyer et al. |

FOREIGN PATENT DOCUMENTS

| | | | |
|---|---|---|---|
| JP | H08104870 A | | 4/1996 |
| JP | H11100575 A | | 4/1999 |
| JP | H11130729 A | | 5/1999 |
| JP | 2002201222 A | | 7/2002 |
| JP | 2002265421 A | | 9/2002 |
| JP | 2002308832 A | | 10/2002 |
| JP | 2002533742 A | | 10/2002 |
| JP | 2003026707 A | | 1/2003 |
| JP | 2005112945 A | | 4/2005 |
| JP | 2005263789 A | | 9/2005 |
| JP | 2005309255 A | | 11/2005 |
| JP | 2007141117 A | | 6/2007 |
| JP | 2011133707 A | * | 7/2011 |
| JP | 2014174471 A | | 9/2014 |
| WO | 0037585 A1 | | 6/2000 |

OTHER PUBLICATIONS

Hosaka et al. JP 2003-026707A machine translation via EPO webiste.*
Machine Translation Via EPO for JP2011133707 (A) (Year: 2011).*
EPO Machine Translation JP2002201222.*
May 11, 2020, the Extended European Search Report issued by the European Patent Office in the corresponding European Patent Application No. 17841438.9.
Nov. 7, 2017, International Search Report issued in the International Patent Application No. PCT/JP2017/028969.
Feb. 19, 2019, International Preliminary Report on Patentability issued in the International Patent Application No. PCT/JP2017/028969.

* cited by examiner

DISPLAY MEDIUM FOR ASSESSMENT AND METHOD FOR MANUFACTURING SAME

FIELD

The present invention relates to a display medium for identification, and specifically, to a display medium for authenticity identification that is for determining whether an article having the display medium attached thereto is genuine or counterfeit, and a method for producing the same.

BACKGROUND

As a general practice, a display medium that cannot be easily duplicated is attached to the surface of an article that is required to be authentic to prevent forgery of the article. Such a display medium is required to have characteristics such as not allowing easy duplication and allowing easy determination of the authenticity.

As an example of such a display medium, a display medium including a display layer that reflects only specific polarized light and allow polarized light other than the foregoing to pass therethrough is known. As such a display layer, the display layer prepared by curing a material containing a cholesteric liquid crystal compound (a compound capable of exhibiting a cholesteric liquid crystal phase) is known. For example, it is known that a cholesteric resin layer is prepared by forming a layer of the material containing the cholesteric liquid crystal compound on the surface of a substrate, giving orientation to the cholesteric liquid crystal compound in such a layer to exhibit a cholesteric liquid crystal phase, and curing the layer in a state of maintaining this orientation of the cholesteric liquid crystal compound to express a selective reflection function for circularly polarized light (a function of allowing to pass therethrough one type of circularly polarized light that is either one of clockwise circularly polarized light and counterclockwise circularly polarized light and reflecting a part or all of the other type of the circularly polarized light) (for example, Patent Literature 1).

CITATION LIST

Patent Literature

Patent Literature 1: Japanese Patent Application Laid-Open No. 2014-174471 A

SUMMARY

Technical Problem

However, the formation of such a cholesteric resin layer includes steps such as orienting the cholesteric liquid crystal compound and curing the layer in this state of maintaining this orientation of the compound, thus making the production of the cholesteric resin layer difficult. In particular, a cholesteric liquid crystal compound exhibits various color tones in accordance with a molecular helical pitch in its liquid crystal phase; however, adjustment of the orientation state so as to exhibit a desired color tone is very difficult compared to imparting a desired color tone by performing printing using an ink containing a usual dye.

Further, if it is possible to draw a pattern by disposing cholesteric resins having different helical pitches and thereby exhibiting plural types of color tones in a display region of a display medium, the quality of the display medium design can be improved. However, it is difficult to draw such a pattern by the aforementioned method.

As a method for forming a display layer having high flexibility of design with an easier production step, a method described in Patent Literature 1 using a flake of a cholesteric resin can potentially be adopted. Specifically, the display layer can be formed by crushing the cholesteric resin layer into flakes, dispersing the flakes in a dispersion medium to prepare a dispersion liquid, and performing printing on a substrate using such a dispersion liquid as an ink. By adopting such a method, it becomes possible to form the display layer as easy as performing usual printing in a step subsequent to the ink preparation and it also becomes possible to dispose the cholesteric resins exhibiting plural types of color tones in the display region. However, the flake of the cholesteric resin has a disadvantage in that the expression of the selective reflection function may become insufficient. When the selective reflection function is insufficient, the easiness of authenticity identification decreases and a design value such as glossiness of the display layer may decrease. Reduction in the selective reflection function is particularly prominent when a particle diameter of the flake is small. On the other hand, when the particle diameter of the flake is large, smoothness of surface texture of the display layer is lowered and the design flexibility deteriorates. Further, when a coating material containing the flakes of the cholesteric resin is used for printing, there is a disadvantage in that the flake easily snags on a member that handles the coating material in a printing device. For example, when printing is performed using a doctor blade, the flake snags on the blade and may cause a problem such as a gradual reduction in printing density. Such a problem becomes particularly apparent when the particle diameter of the flake is large.

Thus, an object of the present invention is to provide a display medium for authenticity identification, which cannot be easily duplicated, in which authenticity can be easily determined, and which is easily produced and has high design flexibility, and a method for producing the display medium for authenticity identification.

Solution to Problem

The present inventor has conducted studies for solving the aforementioned problems. As a result, the present inventor has found that the problems can be solved by using a droplet-cured product formed of a cholesteric resin as a material constituting a display layer, thereby completing the present invention.

That is, the present invention provides the following <1> to <6>.

<1> A display medium comprising a display layer for authenticity identification, wherein
 the display layer contains a droplet-cured product, and
 the droplet-cured product contains a resin having cholesteric regularity.
<2> The display medium according to <1>, wherein
 the droplet-cured product contains a cured product of a liquid crystal material containing a cholesteric liquid crystal compound.
<3> The display medium according to <1> or <2>, wherein
 the display layer is a cured product of a coating material containing the droplet-cured product.
<4> The display medium according to any one of <1> to <3>, wherein the display layer contains plural types of droplet-cured products exhibiting different color tones as the droplet-cured product.

<5> The display medium according to any one of <1> to <4>, wherein the display layer further contains a metal particle.

<6> A method for producing the display medium of any one of <1> to <5>, comprising:

a step of preparing a dispersion liquid containing a dispersion medium and droplets of a liquid crystal material dispersed in the dispersion medium, the liquid crystal material containing a cholesteric liquid crystal material;

a step of adjusting a temperature of the dispersion liquid to thereby adjust a color tone of the liquid crystal material in the droplets to a desired color tone;

a step of curing the liquid crystal material in the dispersion liquid while in a state of exhibiting the desired color tone to thereby obtain a droplet-cured product; and a step of disposing the droplet-cured product on a surface of a substrate to form a display layer.

Advantageous Effects of Invention

The display medium of the present invention can be usefully used as a display medium for authenticity identification which cannot be easily duplicated, in which authenticity can be easily determined, and which is easily produced and has high design flexibility. According to the production method of the present invention, such a display medium of the present invention can be easily produced.

DESCRIPTION OF EMBODIMENTS

Figure 1:
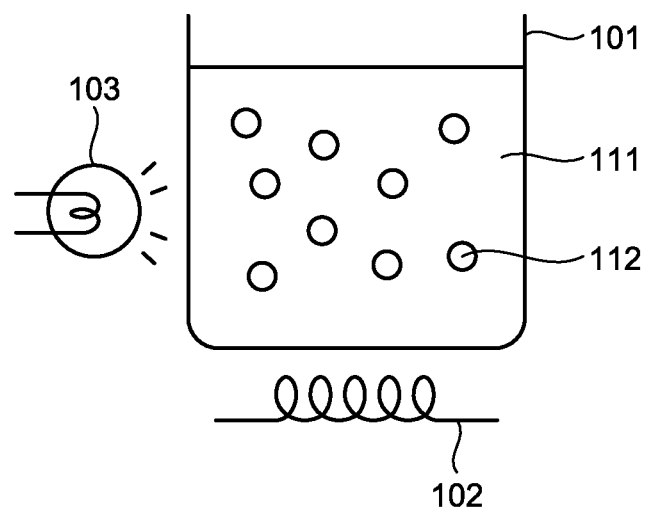
FIG. 1 is a side view schematically illustrating a device for preparing a droplet-cured product used in the present invention.

Hereinafter, the present invention will be described in detail with reference to examples and embodiments. However, the present invention is not limited to the following examples and embodiments and may be freely modified for implementation without departing from the scope of claims of the present invention and the scope of their equivalents.

[1. Summary of Display Medium]

The display medium of the present invention includes a display layer for authenticity identification. The display layer contains a specific droplet-cured product.

[2. Droplet-Cured Product]

The droplet-cured product is a product prepared by curing a droplet. The droplet is a mass of a liquid formed in an integrated shape by interfacial tension. The interfacial tension may be an interfacial tension acting on the interface between the droplet and a dispersion medium. In the case where a capsule is formed as the droplet-cured product, interfacial tension may be an interfacial tension acting on the interface between a material for forming a shell of the capsule and the dispersion medium.

In order to maintain an integrated shape by the interfacial tension, the droplet may be formed in a sphere shape or a shape approximate to the sphere shape. The droplet-cured product may be a product prepared by curing the droplet while in a state of maintaining such a shape. Thus, the droplet-cured product may also be formed in a sphere shape or a shape approximate to the sphere shape. Specifically, a long diameter DL and a short diameter DS of the droplet-cured product preferably satisfy a relation of $(DL-DS)/DL$ 0.05, more preferably satisfy a relation of $(DL-DS)/DL$ 0.01. As the long diameter DL, an average value of the long diameter determined in 100 or more randomly selected droplet-cured product images obtained by microscope observation of the droplet-cured products may be adopted. Further, as $(DL-DS)$, an average value of difference between the long diameter and the short diameter determined in 100 or more randomly selected droplet-cured product images obtained by microscope observation of the droplet-cured products may be adopted. The upper limit of the number of images to be observed is not particularly limited, but the number of images is preferably large from the viewpoint of obtaining an accurate numeric value. However, from the viewpoint of convenience in measurement, the number may be set to, for example, 200 or less.

The droplet-cured product contains a resin having cholesteric regularity. In the present application, a resin having cholesteric regularity may be simply referred to as a "cholesteric resin".

That the cholesteric resin "has cholesteric regularity" means that molecules in the resin have specific regularity that will be described in the following. When molecules in a layer have cholesteric regularity, molecules on a first plane inside the resin are disposed in a manner such that axes of the molecules are oriented in a certain direction. A direction of the molecular axes on a second plane that is adjacently stacked with the first plane inside the resin is displaced by a small angle with respect to the direction of the molecular axes on the first plane. A direction of the molecular axes on a third plane that is further adjacently stacked with the second plane is further displaced by an angle with respect to the direction of the molecular axes on the second plane. In this configuration, angles of the molecular axes are sequentially displaced (twisted) on the planes disposed in a stacked manner. The structure in which the directions of the molecular axes are sequentially twisted in this manner constitutes an optically chiral structure.

The droplet-cured product may contain a cured product of a material containing a cholesteric liquid crystal compound. In the present application, the material containing the cholesteric liquid crystal compound may be simply referred to as a "cholesteric liquid crystal material".

[2.1. Preparation of Droplet-Cured Product]

The droplet-cured product may be prepared by dispersing the cholesteric liquid crystal material as a dispersion phase in a dispersion medium to constitute a droplet and curing the droplet. The dispersion may be achieved by mixing the dispersion medium and the cholesteric liquid crystal material with a device such as a mixer.

The cholesteric liquid crystal material is, in many cases, lipophilic, and thus, a hydrophilic medium may be used as a dispersion medium used for preparing the droplet. Specifically, water or an aqueous solution containing water and an additive may be used. As such an additive, any known substance for adjusting dispersibility may be used. Examples thereof may include polyethylene maleic anhydride sodium salt, methyl cellulose, hydroxypropyl methyl cellulose, polyvinyl alcohol, gelatin, citric acid, polyoxyethylene sorbitan monolaurate, sodium dodecylbenzenesulfonate, and combinations thereof.

The cholesteric liquid crystal material as the dispersion phase includes a cholesteric liquid crystal compound and may further include a solvent that dissolves the cholesteric liquid crystal compound. The cholesteric liquid crystal compound refers to a compound capable of exhibiting a cholesteric liquid crystal phase under a certain condition. The cholesteric liquid crystal compound is preferably a polymerizable liquid crystal compound that can be converted to a cholesteric resin by curing through polymerization. As the solvent, a substance suitable for dissolving the cholesteric liquid crystal compound and dispersion in the dispersion medium may be appropriately selected. Examples of the solvent may include cyclopentanone.

The cholesteric liquid crystal material may include a polymerization initiator. When the polymerization initiator is included, the cholesteric resin can be easily formed by polymerizing the polymerizable cholesteric liquid crystal compound while in a state of expressing a cholesteric liquid crystal phase. As the polymerization initiator, a photopolymerization initiator that initiates polymerization by irradiation of infrared light, visible light, ultraviolet light, or the like is preferable and the polymerization initiator that initiates polymerization by ultraviolet light is particularly preferable. Specific examples of the polymerizable liquid crystal compound, the polymerization initiator, and other substances, which may be contained in the cholesteric liquid crystal material, will be described below.

The droplet-cured product may be prepared by adjusting a color tone of the cholesteric liquid crystal material in the droplet to a desired color tone and curing the cholesteric liquid crystal material while in a state of exhibiting such a desired color tone in the dispersion medium.

Adjustment of the color tone of the cholesteric liquid crystal material may be performed by adjusting a temperature of the dispersion liquid. Further, curing of the cholesteric liquid crystal material may be performed by adopting a material that can be cured by light such as ultraviolet rays as the cholesteric liquid crystal material and irradiating such light to the cholesteric liquid crystal material while in a state of exhibiting the desired color tone.

Examples of preparation of such a droplet-cured product will be described with reference to FIG. 1. FIG. 1 is a side view schematically illustrating a device for preparing the droplet-cured product used in the present invention. In FIG. 1, a dispersion liquid containing a dispersion medium 111 and droplets 112 of cholesteric liquid crystal materials dispersed in the dispersion medium 111 are filled in a container 101. The container 101 is made from a material capable of transmitting light from a light source 103 near the container 101. A heating device 102 is also disposed near the container 101.

In this example, a color tone of the cholesteric liquid crystal material in the droplet 112 can be changed by heating the dispersion liquid containing the droplet 112 by the heating device 102. Specifically, the cholesteric liquid crystal material contained in the droplet 112 can exhibit a cholesteric liquid crystal phase at a temperature within a certain range. A helical pitch of the cholesteric liquid crystal phase may change in accordance with a change in the temperature. Thus, the helical pitch of the cholesteric liquid crystal phase in the droplet can be maintained at a certain value by maintaining the dispersion liquid at a certain temperature. The cholesteric liquid crystal material exhibiting the cholesteric liquid crystal phase expresses a selective reflection function within a certain wavelength range and can consequently exhibit a certain color tone. The color tone corresponds to the helical pitch of the cholesteric liquid crystal phase. Thus, the droplet 112 can be caused to exhibit a desired color tone by maintaining the dispersion liquid at a certain temperature. The relationship between the temperature and the color tone varies depending on the material in use; however, adjustment of the color tone may be performed by, for example, heating to 110° C. for a blue color, heating to 120° C. for a green color, and heating to 130° C. for a red color.

While maintaining the temperature at which the desired color tone is exhibited in this manner, irradiation with light capable of curing the cholesteric liquid crystal material can be performed from the light source 103 to the droplet 112. The cholesteric liquid crystal material is cured by such irradiation and becomes a cholesteric resin. In this manner, the droplet-cured product may be prepared. As the light to be irradiated, light suitable for curing the cholesteric liquid crystal material, such as infrared light, visible light, and ultraviolet light, may be appropriately selected.

The light irradiation step may be performed only once or performed a plurality of times in a divided manner. It is particularly preferable that the cholesteric liquid crystal compound that includes a polymerizable liquid crystal compound (iw) (to be described later) is adopted and used with a polymerizable chiral compound, a combination of weak light irradiation and a subsequent heating step is performed once or more, and then strong light irradiation is performed to cure the cholesteric liquid crystal material. By performing such operations, it becomes possible to obtain a cholesteric resin having a gradient in the molecular helical pitches. As a result, the droplet-cured product exhibiting a silver color tone can be obtained. Such processing is referred to as band widening processing.

[2.2. Cholesteric Resin Capsule]

In a preferred aspect, the droplet-cured product may be encapsulated in a shell to form a capsule shape. That is, in such a capsule, the cholesteric resin forms a core encapsulated in the shell. In the present application, the capsule including the core of the cholesteric resin may be simply referred to as a "cholesteric resin capsule". In the cholesteric resin capsule, the core may be a cured product of the cholesteric liquid crystal material.

The cholesteric resin capsule may be prepared by forming a liquid crystal material capsule encapsulating the cholesteric liquid crystal material and processing the resulting capsule. In the present application, the capsule encapsulating the cholesteric liquid crystal material before being cured may be referred to as a "liquid crystal material capsule" for the sake of distinguishing it from the capsule after curing.

[2.2.1. Liquid Crystal Material Capsule]

The liquid crystal material capsule may be prepared by dispersing the cholesteric liquid crystal material in the dispersion medium as the dispersion phase and forming a shell at the interface between the cholesteric liquid crystal material and the dispersion medium.

As the dispersion medium for preparing the capsule, a hydrophilic medium may be used. Specific examples thereof may include the same medium as the examples for the dispersion medium of the droplet described above. Specific examples of the polymerizable liquid crystal compound, the polymerization initiator, and other substances, which constitute the cholesteric liquid crystal material used for preparing the capsule, may include the same materials as the specific examples for those for the droplet described above.

In addition, the cholesteric liquid crystal material used for preparing the capsule may include a component used for forming the shell if necessary.

Specific examples of the method for forming the shell may include an interfacial polymerization method, an in-situ polymerization method, and a phase separation method. In the interfacial polymerization method, monomers present in a dispersion phase and a continuous phase (a dispersion medium) are reacted on the interface therebetween to form a shell. In the in-situ polymerization method, a material that can form a polymer by polymerization through being brought into contact with the dispersion phase is added to the continuous phase to cause a reaction and thereby form a shell. The phase separation method utilizes a property that a material of the shell present in the continuous phase causes phase separation from the continuous phase. In this method, the material is localized on the periphery of the dispersion phase to form a shell.

As the material of the shell, a material which is suitable for a method for forming the shell to be adopted and from which a capsule having high stability can be obtained may be appropriately selected. For example, in the case where the shell is formed by the interfacial polymerization method, an isocyanate compound such as hexamethylene diisocyanate is used as a monomer to be added to the dispersion phase, while a polyol compound such as polyethylene glycol is used as a monomer to be added to the continuous phase, and then these monomers may be reacted with each other on the interface between these phases. The shell may be formed by such a reaction. In the case where the shell is formed by the in-situ polymerization method, a mixture of melamine, urea, or a combination thereof, and formaldehyde may be used as a monomer to be added to the continuous phase. In the case where the shell is formed by the phase separation method, a macromolecular compound such as gelatin and polyvinyl alcohol may be used as a material of the shell to be added to the continuous phase. Further, addition of a salt such as sodium carbonate to the continuous phase can facilitate the phase separation.

[2.2.2. Preparation of Cholesteric Resin Capsule]

The cholesteric resin capsule may be prepared by adjusting a color tone of the cholesteric liquid crystal material to a desired color tone and curing the cholesteric liquid crystal material while in a state of exhibiting such a desired color tone in the obtained liquid crystal material capsule. Adjustment of the color tone and curing of the cholesteric liquid crystal material may be performed with the same operations as those described above for the droplet. The color tone adjustment and curing steps may be performed while in a state in which the liquid crystal material capsule is dispersed in a dispersion medium. As the dispersion medium, the dispersion medium used for preparing the liquid crystal material capsule as it is may be used. Alternatively, the dispersion medium may be replaced with a different dispersion medium for use.

[2.3. Properties of Droplet-Cured Product]

The size of the droplet-cured product may be adjusted by adjusting state of dispersion of the droplet. Its diameter is not particularly limited and may be appropriately adjusted to a range suitable for the use of the droplet-cured product. The diameter of the droplet-cured product is preferably 0.5 µm or more, and more preferably 1 µm or more, and is preferably 10 µm or less, and more preferably 6 µm or less. In the case where the droplet-cured product takes a form of a capsule, the diameter of the outer surface of the shell at the outermost layer may be set to fall within such a range.

A selective reflection band (a light wavelength band in which the selective reflection function is expressed) of the droplet-cured product may be appropriately adjusted so as to obtain a desired design effect.

In an aspect, the selective reflection band may be set to a relatively narrow band within a visible wavelength region. By such a feature, the droplet-cured product can be imparted with a specific color tone to obtain a design effect of the color tone. For example, when a half width of the selective reflection band within the visible wavelength region is set to 30 to 100 nm and a peak of the selective reflection band is in a band between 600 and 750 nm, the droplet-cured product can be imparted with a red color tone. As another example, when the half width of the selective reflection band within the visible wavelength region is set to 30 to 100 nm and the peak of the selective reflection band is in a band between 400 and 495 nm, the droplet-cured product can be imparted with a blue color tone.

In another aspect, the droplet-cured product preferably has the wide selective reflection band equal to or greater than a specific range within the visible wavelength region. Specifically, the half width of the selective reflection band within the visible wavelength region may be set to preferably 30 nm or more, more preferably 50 nm or more, further more preferably greater than 100 nm, and particularly preferably an entire region of the visible wavelength region. When the droplet-cured product has the selective reflection function in such a wide range, the droplet-cured product can exhibit a silver color tone.

The wavelength and width of the selective reflection band may be adjusted by appropriately adjusting a composition of the cholesteric liquid crystal material, conditions of the color tone adjustment and the band widening processing described above, and the like.

[3. Display Layer]

The dispersion product containing the droplet-cured product thus obtained as it is may be used as a coating material containing the droplet-cured product. Alternatively, the obtained dispersion product may be subjected to a processing to prepare a coating material containing the droplet-cured product. Examples of such processing may include concentration, replacement of the dispersion medium, mixture of plural types of the droplet-cured products exhibiting different color tones, and mixture of an optional component. Examples of the optional component may include dyes exhibiting any optional color tones other than the droplet-cured product. For example, a metal particle exhibiting a silver color tone may be used. Other examples of the optional component may include a component such as a binder that facilitates fixation of the droplet-cured product on a substrate.

The droplet-cured product may be separated and extracted from the obtained dispersion product and used as a powder material for forming a display layer.

From the viewpoint of easiness of a step of forming the display layer, it is preferable that the formation of the display layer is performed using a coating material containing the droplet-cured product. In this case, the display layer is a cured product of such a coating material. Specifically, a display medium including a substrate and the display layer disposed on the surface of the substrate may be produced by applying the coating material containing the droplet-cured product onto the substrate and volatilizing the dispersion medium.

The thickness of the display layer is not particularly limited and may be set to any thickness suitable for the formation of the display layer and the use of the display medium. The thickness of the display layer is preferably 2 μm or more, and more preferably 5 μm or more, and is preferably 15 μm or less, and more preferably 10 μm or less.

In the case where the display medium of the present invention includes the substrate, a substrate film is usually used as such a substrate. As the substrate film, a film usable as a substrate for an optical layered body may be appropriately selected for use.

The material of the substrate film is not particularly limited and various types of resins may be used. Examples of the resin may include resins that contain various types of polymers. Examples of the polymer may include an alicyclic structure-containing polymer, a cellulose ester, polyvinyl alcohol, polyimide, a UV-transmitting acryl, polycarbonate, polysulfone, polyether sulfone, an epoxy polymer, polystyrene, polyvinyl chloride, and combinations thereof. Of these, an alicyclic structure-containing polymer and a cellulose ester are preferable, and an alicyclic structure-containing polymer is more preferable from the viewpoint of transparency, low hygroscopicity, size stability, and lightweight properties.

The display layer may be disposed in the display medium so as to exhibit a desired authenticity identification capability and a desired design effect. Examples of such disposing will be described with reference to FIG. 2 to FIG. 4.

Figure 2:
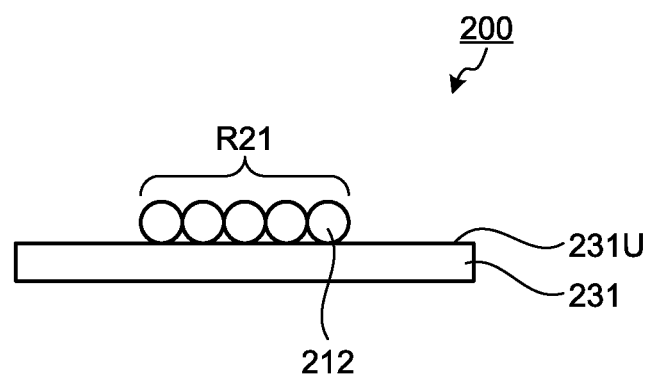
FIG. 2 is a vertical cross-sectional view schematically illustrating an example of the display medium of the present invention.

FIG. 2 is a vertical cross-sectional view schematically illustrating an example of the display medium of the present invention. In FIG. 2, a display medium 200 includes a substrate 231 and a display layer R21 disposed on an upper surface 231U of the substrate 231. In this example, the display layer R21 includes droplet-cured products 212. Since the droplet-cured product 212 includes a cholesteric resin, the display layer R21 has a selective reflection function for circularly polarized light. Thus, among the light entering the display layer R21, one type of the circularly polarized light is partially or entirely reflected by the cholesteric resin, wherein the circularly polarized light is either one of clockwise circularly polarized light and counterclockwise circularly polarized light. Thus, observed color tones differ for a case in which the display layer R21 is observed through a circular polarizer that allows to pass therethrough only one of clockwise circularly polarized light and counterclockwise circularly polarized light, and for another case in which the display layer R21 is observed through a circular polarizer that allows to pass therethrough only the other of circularly polarized light. By confirming the existence of such a difference in color tones, the fact that the display layer R21 is not a layer that only includes an ordinary dye but a layer that includes the droplet-cured product can be confirmed, and thereby the authenticity of the display medium can be confirmed. The shape of the surface of the display layer R21 in the display medium is not particularly limited and the surface of the display layer R21 may be formed in any shapes of characters, figures, and the like. By confirming a difference in color tones in such shapes, the authenticity of the display medium can be confirmed.

In the example illustrated in FIG. 2, the display layer R21 includes one type of the droplet-cured product 212; however, the display medium of the present invention is not limited thereto and the display layer may include plural types of the droplet-cured products. For example, plural types of the droplet-cured products exhibiting different color tones may be mixed and disposed to constitute a display layer that exhibits an intermediate color of these color tones. Further, for example, a plurality of regions may be set in the surface of the display layer. In this case, a droplet-cured product exhibiting a certain color tone may be disposed in a certain region while a droplet-cured product exhibiting another certain color tone may be disposed in another certain region, whereby a display layer on which an observer can recognize a pattern formed by a plurality of color tone regions can be constituted.

Figure 3:
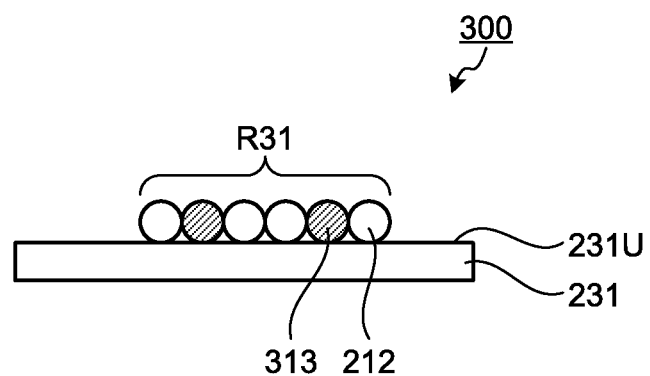
FIG. 3 is a vertical cross-sectional view schematically illustrating another example of the display medium of the present invention.

FIG. 3 is a vertical cross-sectional view schematically illustrating another example of the display medium of the present invention. In FIG. 3, a display medium 300 includes a substrate 231 and a display layer R31 disposed on an upper surface 231U of the substrate 231. In this example, the display layer R31 includes the droplet-cured products 212 and particles 313 other than the droplet-cured products 212 in a mixed state. As such particles 313, particles of any color tones and materials may be used. For example, a particle exhibiting a silver color tone made of metal such as aluminum may be used. Observed color tones differ due to selective reflection by the droplet-cured product 212 for a case in which the display layer R31 is observed through a circular polarizer that allows to pass therethrough only one of clockwise circularly polarized light and counterclockwise circularly polarized light and for a case in which the display layer R31 is observed through a circular polarizer that allows to pass therethrough only the other of the circularly polarized light. By confirming such a difference in color tones, the authenticity of the display medium can be confirmed.

In the example illustrated in FIG. 3, the display layer R31 includes one type of the droplet-cured product 212; however, the display medium of the present invention is not limited thereto and the display layer may include plural types of the droplet-cured products.

Figure 4:
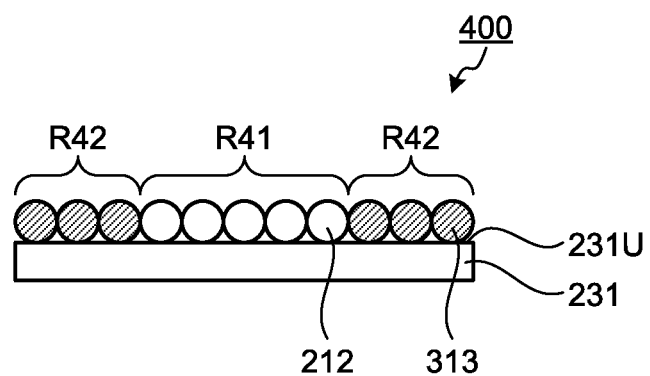
FIG. 4 is a vertical cross-sectional view schematically illustrating still another example of the display medium of the present invention.

FIG. 4 is a vertical cross-sectional view schematically illustrating still another example of the display medium of the present invention. In FIG. 4, a display medium 400 includes a substrate 231 and display layers R41 and R42 disposed on an upper surface 231U of the substrate 231. In this example, the display layer R41 includes the droplet-cured products 212 and the display layer R42 includes particles 313 other than the droplet-cured products 212. By disposing the display layers R41 and R42 in adjacent separate regions, a pattern therewith can be formed. As exemplified in FIG. 4, the display medium of the present invention may include a display layer that does not include the droplet-cured product in addition to the display layer that includes the droplet-cured product. Further, in the example illustrated in FIG. 4, the display layer R41 includes one type of the droplet-cured product 212; however, the display medium of the present invention is not limited thereto and the display layer may include plural types of the droplet-cured products.

The color tone of the particle 212 and the color tone of the particle 313 may be freely set. Their color tones may be different from or close to each other. For example, in the case where a particle that includes a cholesteric resin subjected to the band widening processing and exhibits a silver color tone is adopted as the particle 212 and a particle that is made of metal such as aluminum and exhibits a silver color tone is adopted as the particle 313, the resulting display medium can exhibit a pattern which cannot be recognized if the display medium is observed under a normal observation condition (a condition under which observation is made not through a circular polarizer in an environment in which unpolarized light is irradiated) and which can be only recognized if the display medium is observed through a circular polarizer. In this manner, an observer who is not aware of the presence of the display medium cannot visually recognize the presence of the display medium simply by glancing at it. Thus, an effect of further improving a forgery prevention function can be obtained.

By having the display layer including the droplet-cured product, the display medium of the present invention exhibits various advantageous effects. Firstly, the droplet-cured product cannot be easily duplicated compared to a dye in a usual coating material and can be easily distinguished by observation through a circular polarizer. Thus, the display medium of the present invention cannot be easily duplicated and its authenticity can be easily determined. On the other hand, once the droplet-cured product is prepared, production of the display medium itself using the droplet-cured product is as easy as performing usual printing. Further, in a prior-art product such as a flake of the cholesteric resin, problems may occur such as an insufficient expression of the selective reflection function due to irregular reflection or scattering that occurs at the end portion of the cholesteric resin layer, a reduction in smoothness of surface texture of the display layer, and a gradual reduction in printing density due to the flake being snagging on a member that contacts with a coating material in a printing device. Such problems can be reduced in the display medium of the present invention. For example, an ink containing the droplet-cured product can be printed by gravure printing. When a prior-art ink containing the flake is supplied to the gravure printing, the ink is liable to cause plate clogging; however, the occurrence of such a problem is less frequent when the ink containing the droplet-cured product is used. Furthermore, when the droplet-cured product is prepared in the form of the cholesteric resin capsule, the droplet-cured product has high stability in the dispersion medium compared to a prior-art product such as a cholesteric resin flake due to the capsule structure, and a desired color tone can be easily maintained in the dispersion liquid for a long period of time. As a result, the display medium of the present invention is more easily produced and has higher flexibility of design.

[4. Specific Example of Cholesteric Liquid Crystal Compound]

Specific examples of the cholesteric liquid crystal compound that the cholesteric liquid crystal material may contain will be described below.

Examples of the cholesteric liquid crystal compound may include a polymerizable liquid crystal compound (iw) described below, a compound (i) described below, and other compounds described below. These compounds will be described in order.

[4.1.1. Polymerizable Liquid Crystal Compound (iw)]

The polymerizable liquid crystal compound (iw) is a compound represented by the following formula (Iw). The polymerizable liquid crystal compound (iw) is a compound that is not the polymerizable compound (iiw) described later nor a polymerizable chiral compound.

(=O)—, —C(=O)—O—, —O—C(=O)—O—, —C(=O)—NR$^{1w}$—, —O—C(=O)—NR$^{1w}$—, —NR$^{1w}$—C(=O)—O—, —NR$^{1w}$—C(=O)—NR$^{1w}$—, —O—NR$^{1w}$—, or —NR$^{1w}$—O—. Herein, R$^{1w}$ represents a hydrogen atom or an alkyl group of 1 to 6 carbon atoms. R$^{1w}$ is preferably a hydrogen atom or a methyl group.

From the viewpoint of ease of synthesis and better expression of the desired effects of the present invention, particularly preferable combinations of Y's may include a combination in which $Y_{1w}$ and $Y_{3w}$ are —C(=O)—O—, $Y_{4w}$ and $Y_{6w}$ are —O—C(=O)—, and $Y_{2w}$ and $Y_{5w}$ are —O—; and a combination in which $Y_{1w}$ to $Y_{3w}$ are —C(=O)—O—, and $Y_{4w}$ to $Y_{6w}$ are —O—C(=O)—.

$G_{1w}$ and $G_{2w}$ are each independently a divalent aliphatic group of 1 to 20 carbon atoms optionally having a substituent, and preferably a divalent aliphatic group of 1 to 12 carbon atoms optionally having a substituent.

As the divalent aliphatic group of 1 to 20 carbon atoms of $G_{1w}$ and $G_{2w}$, a chain aliphatic group such as an alkylene group of 1 to 20 carbon atoms or an alkenylene group having 2 to 20 carbon atoms is preferable.

From the viewpoint of better expression of the desired effects of the present invention, an alkylene group such as an ethylene group, a butylene group, a hexylene group, or an octylene group is preferable.

Examples of the substituent of the aliphatic group of $G_{1w}$ and $G_{2w}$ may include a halogen atom, and an alkoxy group of 1 to 6 carbon atoms. A fluorine atom is preferable as the halogen atom, and a methoxy group or an ethoxy group is preferable as the alkoxy group.

In the aforementioned aliphatic group, —O—, —S—, —O—C(=O)—, —C(=O)—O—, —O—C(=O)—O—, —NR$^{2w}$—C(=O)—, —C(=O)—NR$^{2w}$—, —NR$^{2w}$—, or —C(=O)— may be interposed (excluding a case where two or more adjacent —O—'s or —S—'s are interposed therein). Herein, R$^{2w}$ represents a hydrogen atom or an alkyl group of 1 to 6 carbon atoms. R$^{2w}$ is preferably a hydrogen atom or a methyl group.

$Z_{1w}$ and $Z_{2w}$ each independently represent an alkenyl group of 2 to 10 carbon atoms which may be substituted with a halogen atom.

Specific examples of the alkenyl group of 2 to 10 carbon atoms of $Z_{1w}$ and $Z_{2w}$ may include $CH_2=CH-$, $CH_2=C(CH_3)-$, $CH_2=CH-CH_2-$, $CH_3-CH=CH-$, $CH_2=CH-CH_2-CH_2-$, $CH_2=C(CH_3)-CH_2-CH_2-$, $(CH_3)_2C=CH-CH_2-$, $(CH_3)_2C=CH-CH_2-CH_2-$, $CH_2=C(Cl)-$, $CH_2=C(CH_3)-CH_2-$, and $CH_3-CH=CH-CH_2-$.

The number of carbon atoms of the alkenyl group is preferably 2 to 6. A chlorine atom is preferable as the halogen atom which is a substituent of the alkenyl group of $Z_{1w}$ and $Z_{2w}$.

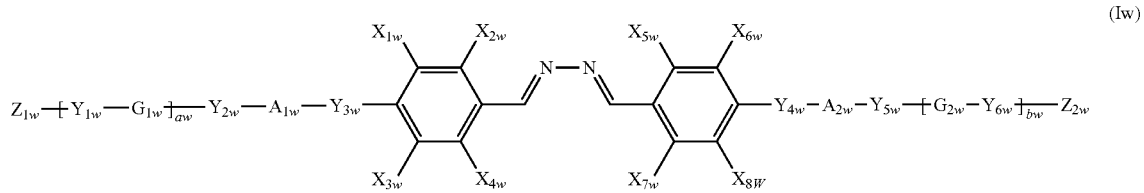

(Iw)

In the foregoing formula (Iw), $Y_{1w}$ to $Y_{6w}$ each independently represent a single bond, —O—, —S—, —O—C Among these, from the viewpoint of better expression of the desired effects of the present invention, as $Z_{1w}$ and $Z_{2w}$, CH$_2$=CH—, CH$_2$=CH(CH$_3$)—, CH$_2$=C(Cl)—, CH$_2$=CH—CH$_2$—, CH$_2$=C(CH$_3$)—CH$_2$—, or CH$_2$=C(CH$_3$)—CH$_2$—CH$_2$— is more preferable.

$X_{1w}$ to $X_{8w}$ each independently represent a hydrogen atom, a halogen atom, an alkyl group of 1 to 10 carbon atoms optionally having a substituent, a cyano group, a nitro group, —OR$^{3w}$, —O—C(=O)—R$^{3w}$, —C(=O)—OR$^{3w}$, —O—C(=O)—OR$^{3w}$, —NR$^{4w}$—C(=O)—R$^{3w}$, —C(=O)—NR$^{3w}$R$^{4w}$, or —O—C(=O)—NR$^{3w}$R$^{4w}$. When $X_{1w}$ to $X_{8w}$ each represent an alkyl group having a substituent, examples of the substituent may include a halogen atom, a hydroxyl group, a methyl group, and an ethyl group. Herein, R$^{3w}$ and R$^{4w}$ represent a hydrogen atom or an alkyl group of 1 to 10 carbon atoms optionally having a substituent, and when they are an alkyl group, the alkyl group may include —O—, —S—, —O—C(=O)—, —C(=O)—O—, —O—C(=O)—O—, —NR$^{5w}$—C(=O)—, —C(=O)—NR$^{5w}$—, —NR$^{5w}$—, or —C(=O)— interposed therein (excluding a case where two or more adjacent —O—'s or —S—'s are interposed therein). Herein, R$^{5w}$ represents a hydrogen atom or an alkyl group of 1 to 6 carbon atoms. When R$^{3w}$ and R$^{4w}$ are an alkyl group having a substituent, examples of the substituent may include a halogen atom, a hydroxyl group, a methyl group, and an ethyl group.

From the viewpoint of availability of raw materials, it is preferable that (1) all of $X_{1w}$ to $X_{8w}$ are a hydrogen atom, (2) all of $X_{1w}$ to $X_{5w}$ and $X_{7w}$ are a hydrogen atom and $X_{6w}$ and $X_{8w}$ are —OCH$_3$, —OCH$_2$CH$_3$, or —CH$_3$, (3) all of $X_{1w}$ to $X_{5W}$ and $X_{7w}$ and $X_{8w}$ are a hydrogen atom and $X_{6w}$ is —C(=O)—OR$^{3w}$, —OCH$_3$, —OCH$_2$CH$_3$, —CH$_3$, —CH$_2$CH$_3$, —CH$_2$CH$_2$CH$_3$, or a fluorine atom, or (4) all of $X_{1w}$ to $X_{4w}$ and $X_{6w}$ to $X_{8w}$ are a hydrogen atom and $X_{5w}$ is —C(=O)—O—R$^{3w}$, —OCH$_3$, —OCH$_2$CH$_3$, —CH$_3$, —CH$_2$CH$_3$, —CH$_2$CH$_2$CH$_3$, or a fluorine atom.

In the formula (Iw), specific examples of the group represented by the formula: —Y$_{2w}$-(G$_{1w}$-Y$_{1w}$)aw-Z$_{1w}$ and the formula: —Y$_{5w}$-(G$_{2w}$-Y$_{6w}$)bw-Z$_{2w}$ bonded to A$_{1w}$ and A$_{2w}$, respectively, may include the following. The aforementioned aw and bw represent the numbers of repetitions of (G$_{1w}$-Y$_{1w}$) unit and (G$_{2w}$-Y$_{6w}$) unit, respectively, and aw and bw are each independently 0 or 1. As a particularly preferable combination of aw and bw, both aw and bw are 1 from the viewpoint of ease of synthesis and better expression of the desired effects of the present invention.

Explanatory examples with aw or bw of 1, that is, the structures represented by the following formula (Cw) will be mentioned below.

(Cw)

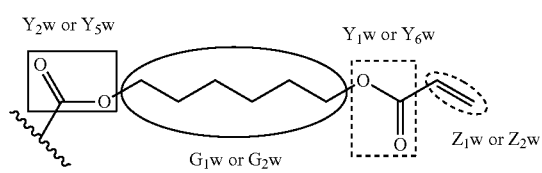

In the formula, $Y_{2w}$ or $Y_{5w}$ corresponds to —C(=O)—O—, $G_{1w}$ or $G_{2w}$ corresponds to a hexylene group, $Y_{1w}$ or $Y_{6w}$ corresponds to —O—C(=O)—, and $Z_{1w}$ or $Z_{2w}$ corresponds to a vinyl group.

Further, specific examples thereof are shown below.

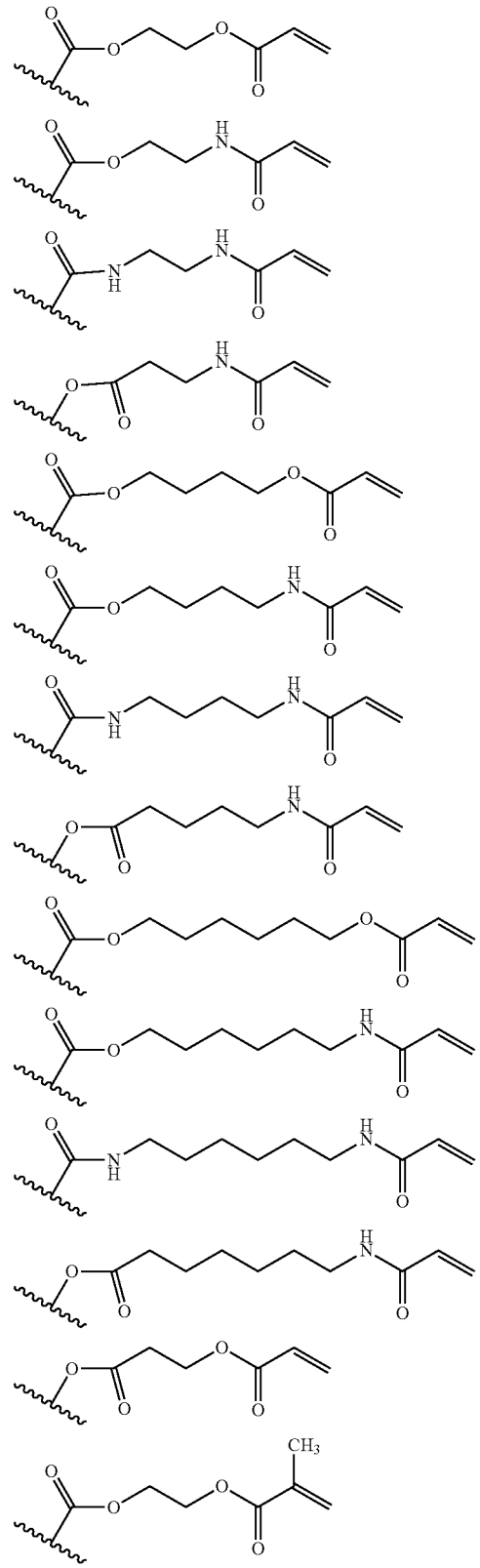

-continued
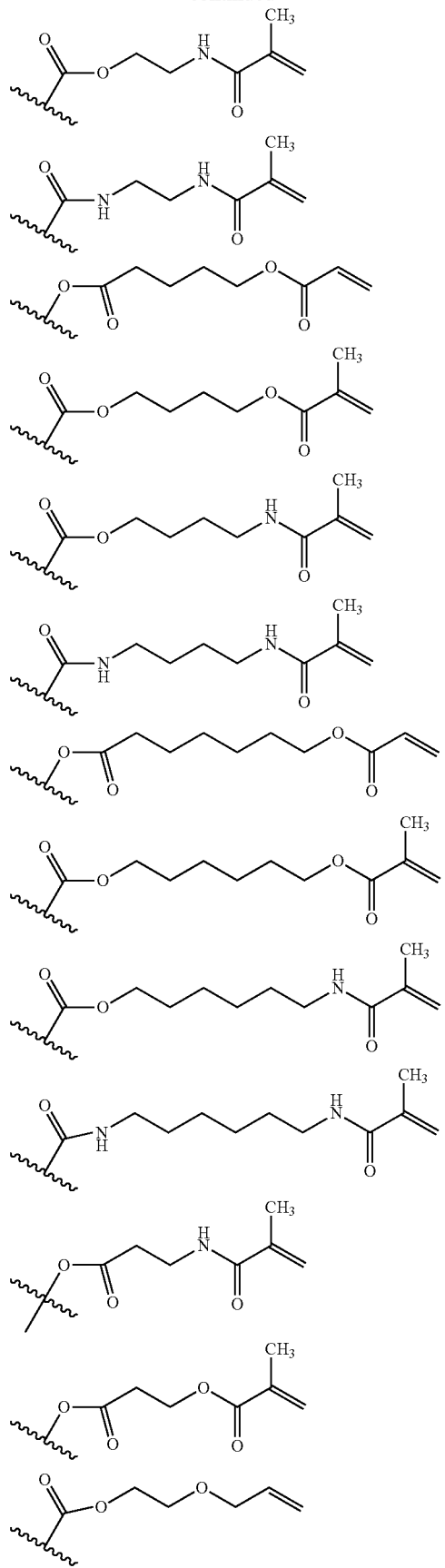
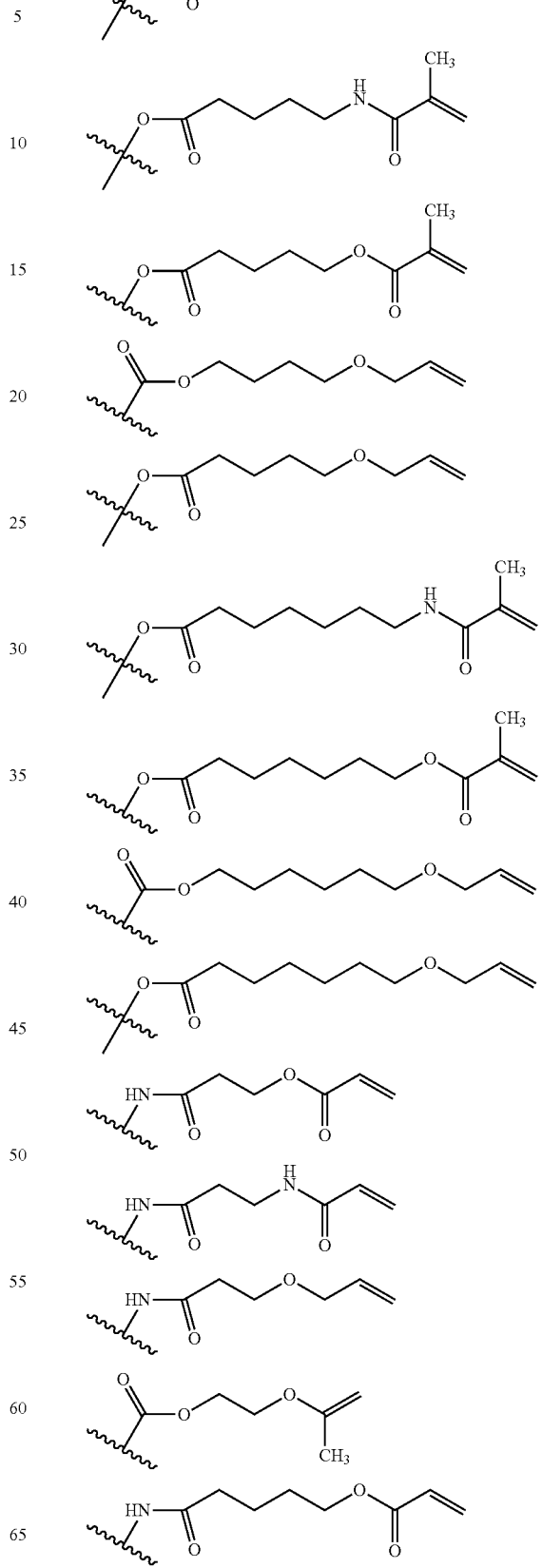

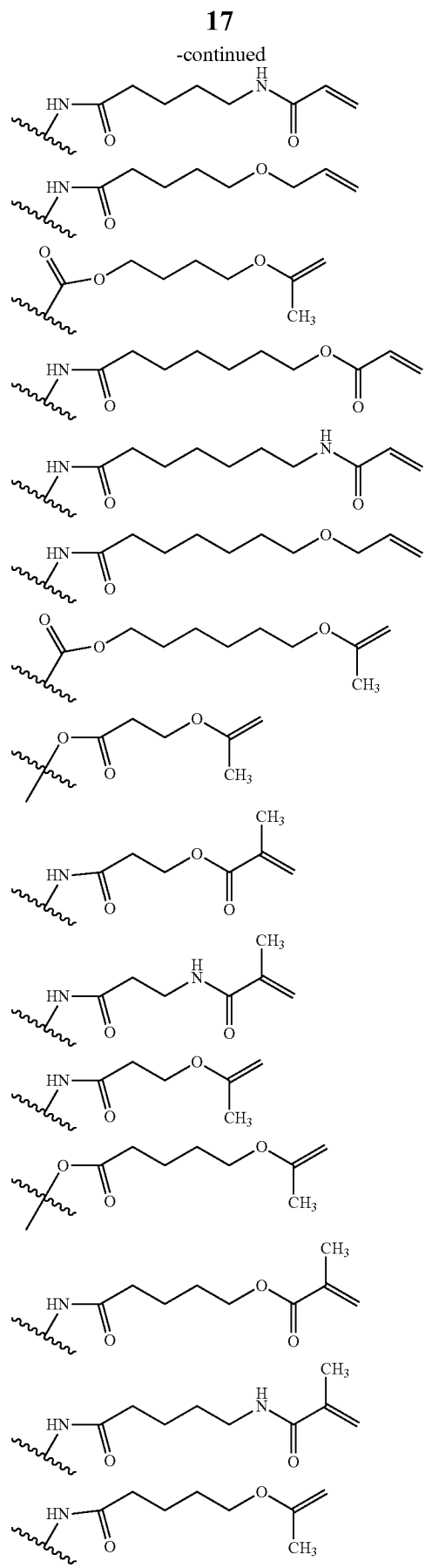
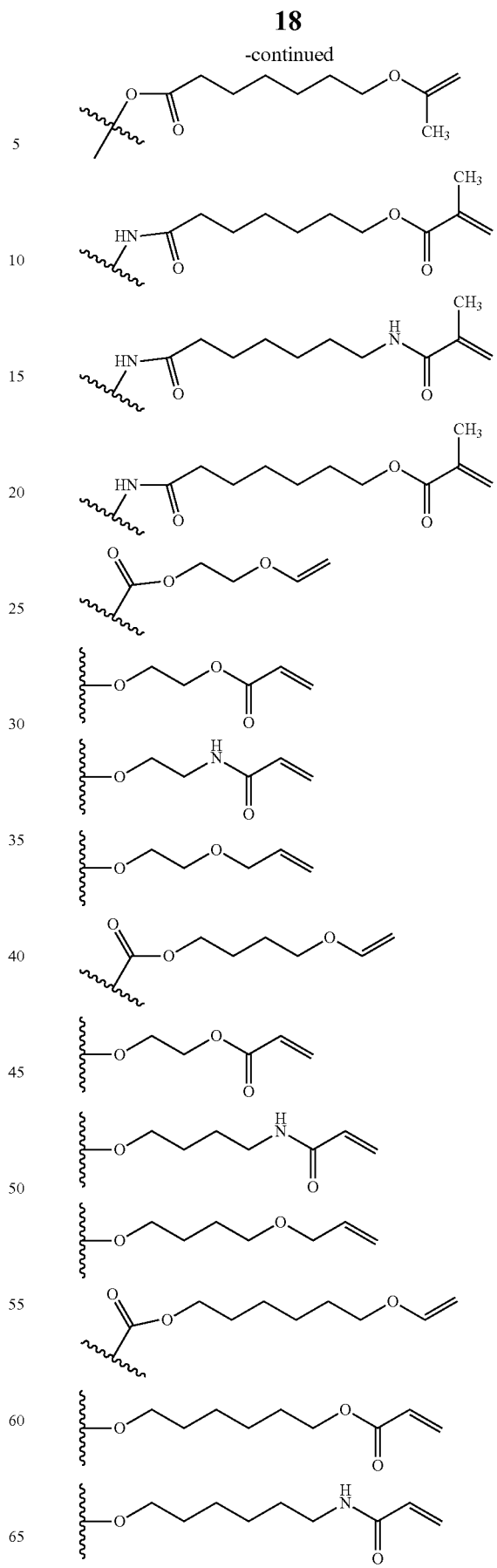

-continued
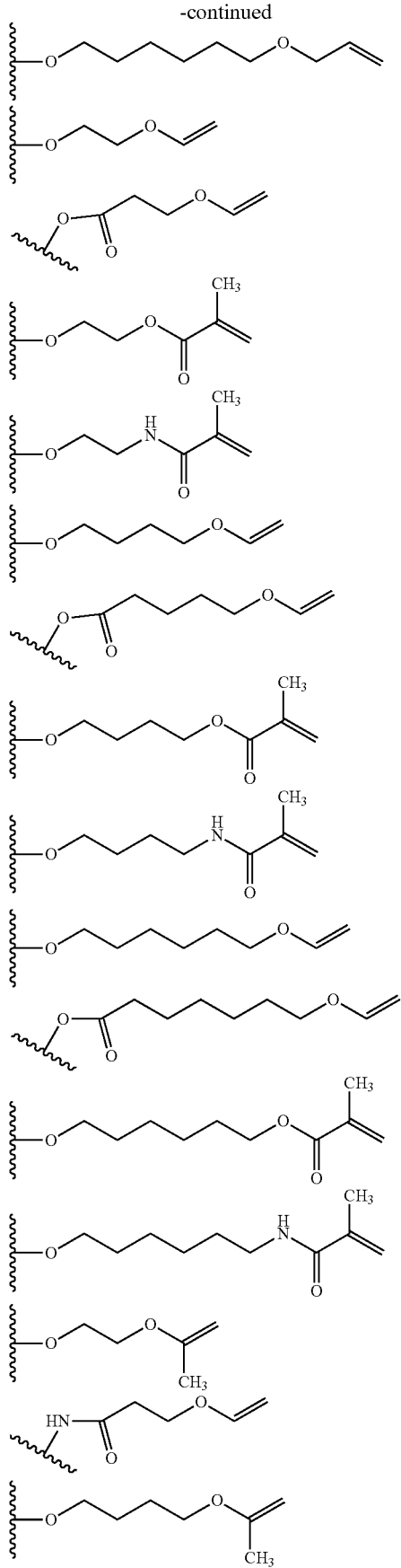
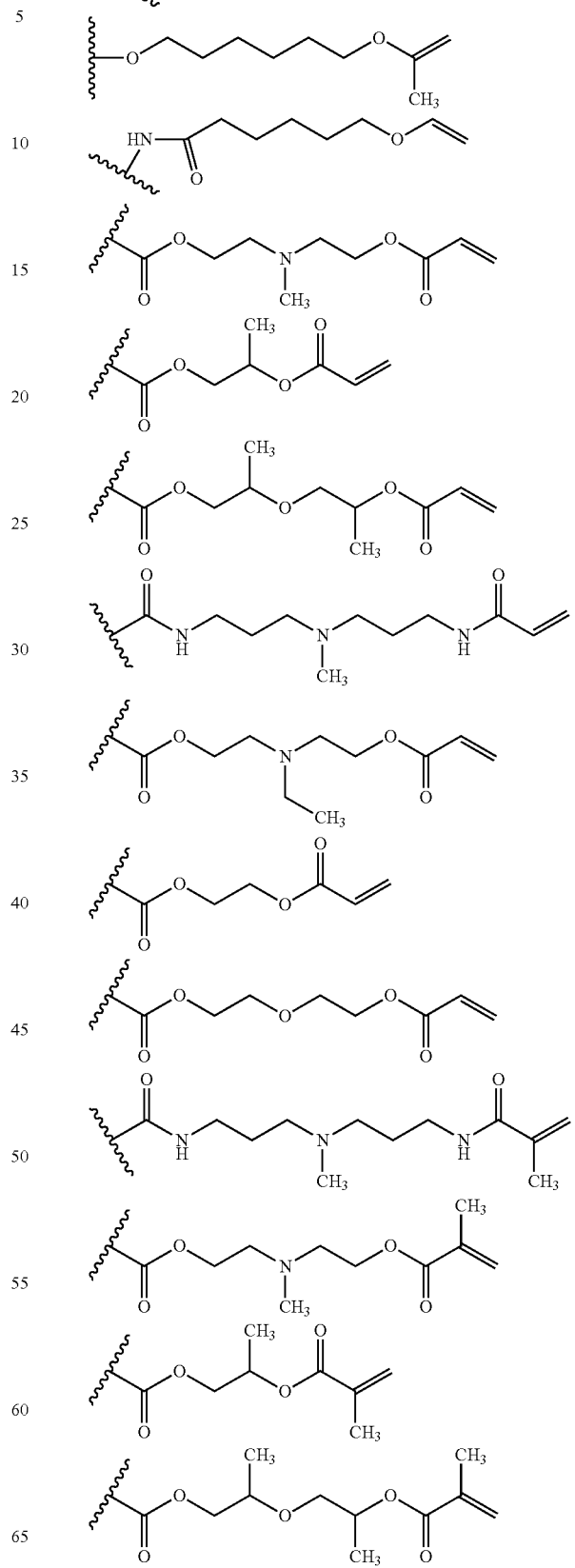

-continued
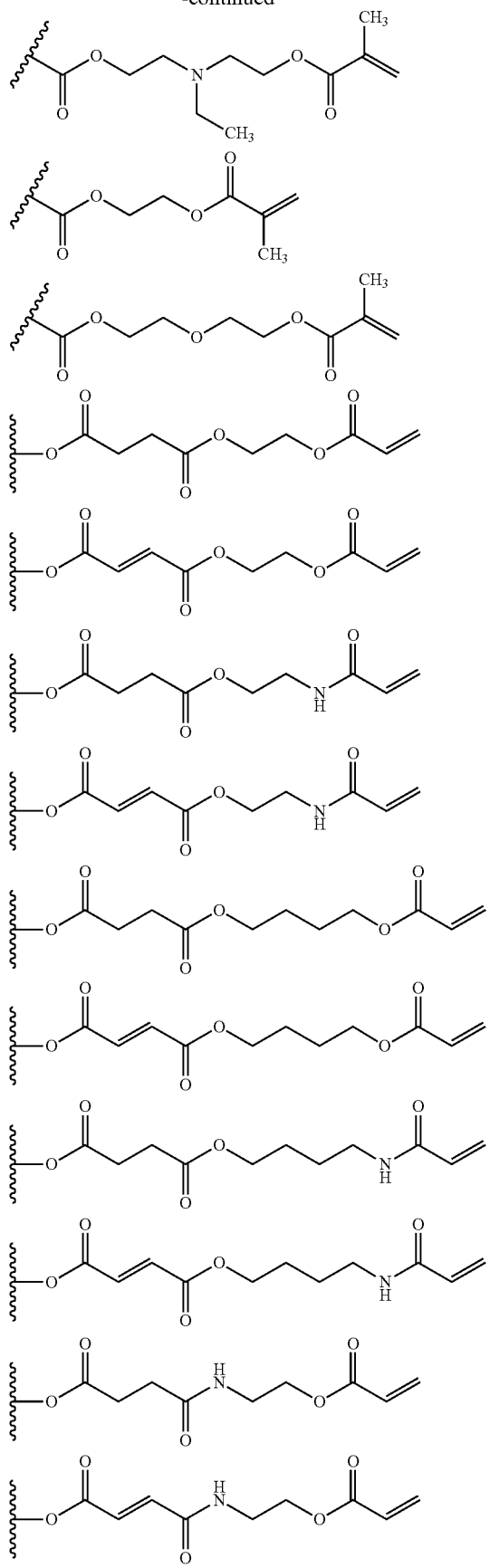
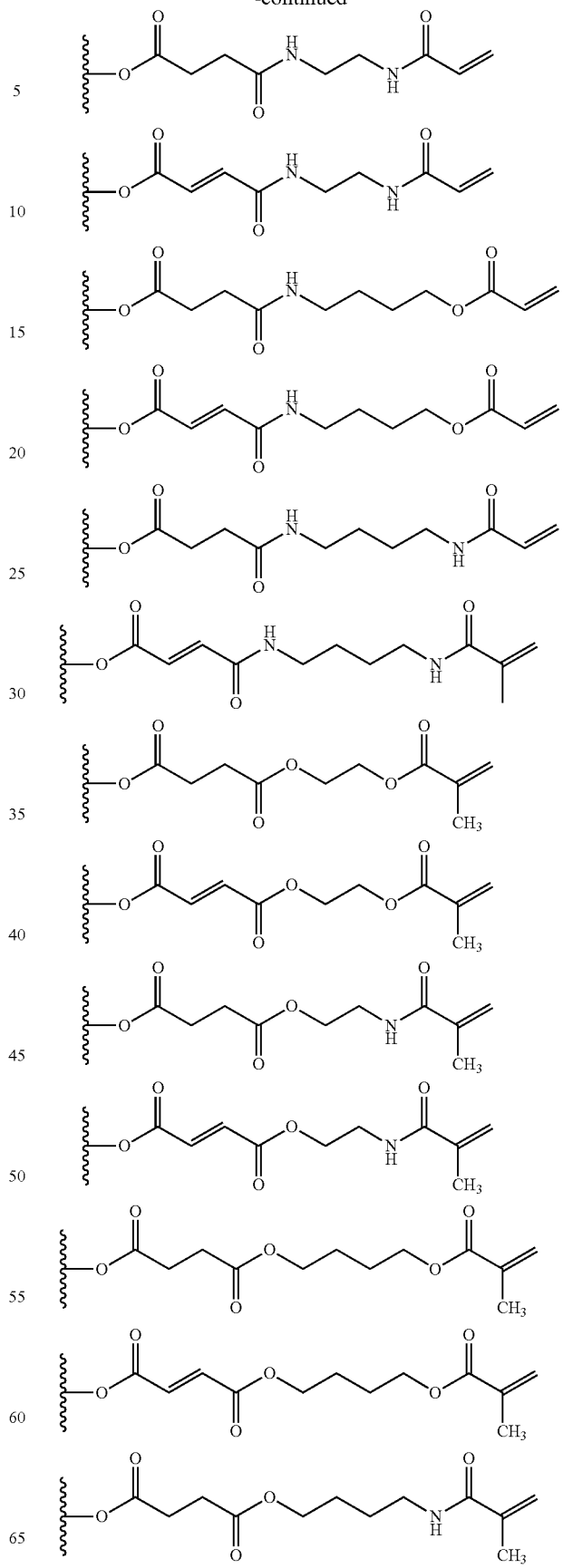

-continued

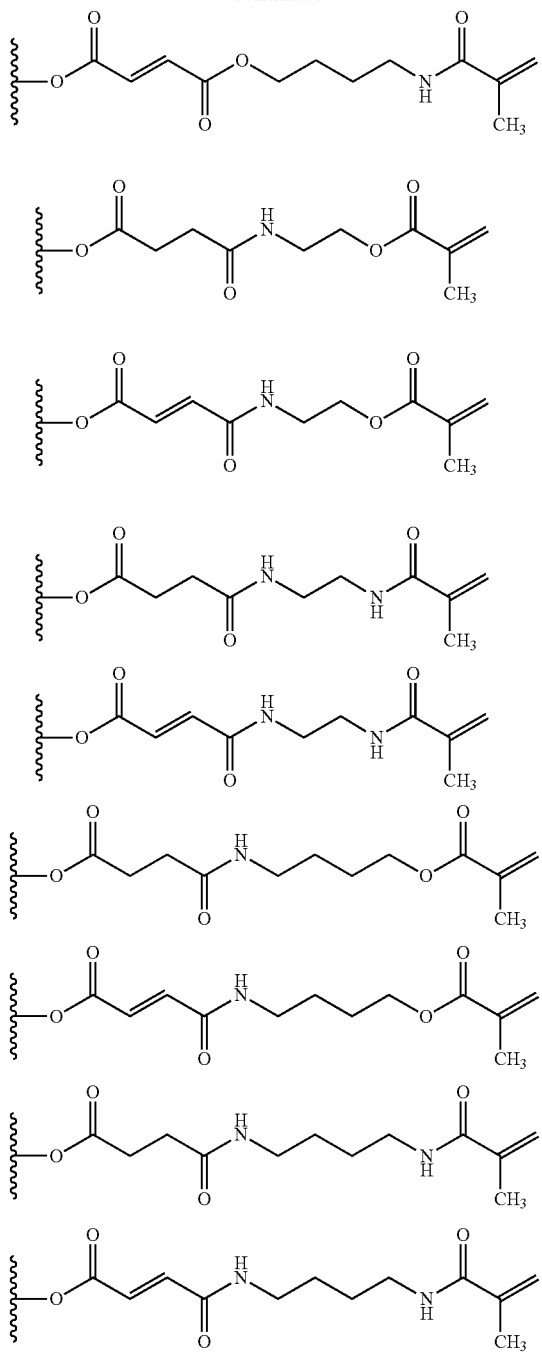

Explanatory examples with aw or bw=0, that is, the structures represented by the following formula (Dw) will be mentioned below.

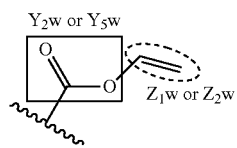

(Dw)

In the formula, $Y_{2w}$ or $Y_{5w}$ corresponds to —C(=O)—O—, and $Z_{1w}$ or $Z_{2w}$ corresponds to a vinyl group.

Further, specific examples thereof are shown below.

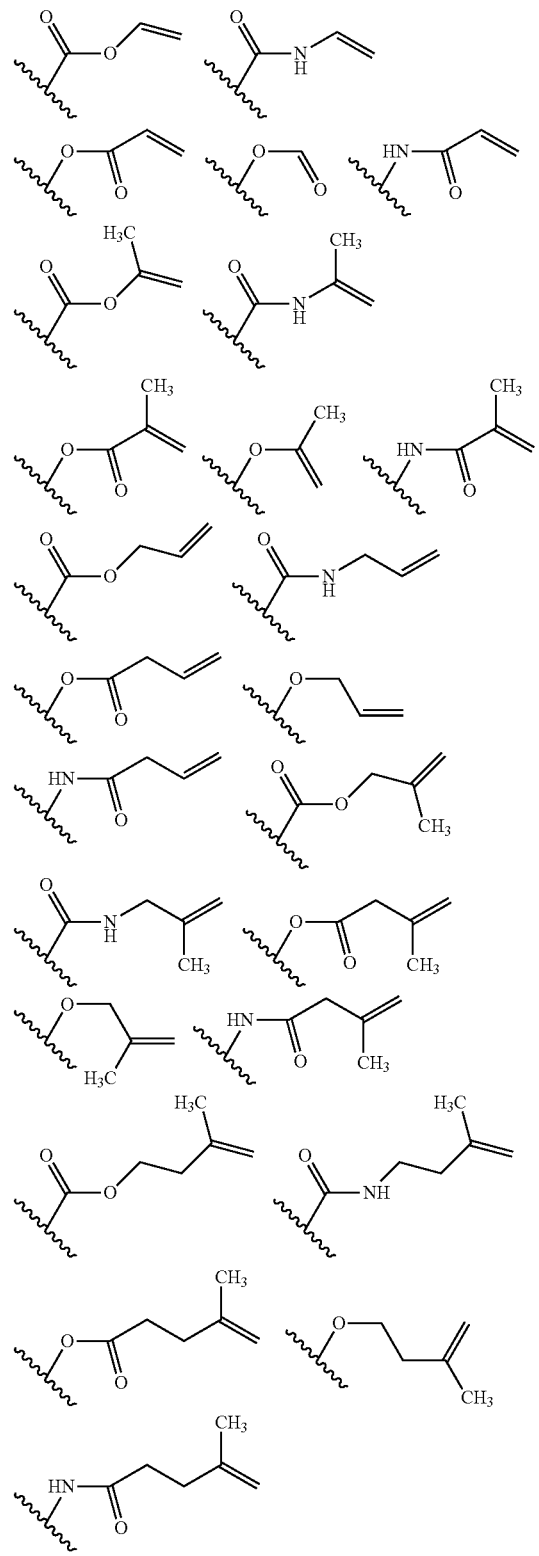

$A_{1w}$ and $A_{2w}$ each independently represent a divalent organic group A of 1 to 30 carbon atoms. The number of carbon atoms of the organic group A is preferably 6 to 20. The organic group A of $A_{1w}$ and $A_{2w}$ is not particularly limited, but is preferably one having an aromatic ring.

Specific examples of $A_{1w}$ and $A_{2w}$ may include the following.

The organic groups mentioned as specific examples of $A_{1w}$ and $A_{2w}$ may have a substituent. Examples of the substituent may include a halogen atom, a cyano group, a hydroxyl group, an alkyl group of 1 to 6 carbon atoms, an alkoxy group of 1 to 6 carbon atoms, a nitro group, and a —C(=O)—OR group. Herein, R is an alkyl group of 1 to 6 carbon atoms. Among these, a halogen group, an alkyl group, and an alkoxy group are preferable; a fluorine atom is more preferable as the halogen atom; a methyl group, an ethyl group, and a propyl group are more preferable as the alkyl group; and a methoxy group and an ethoxy group are more preferable as the alkoxy group.

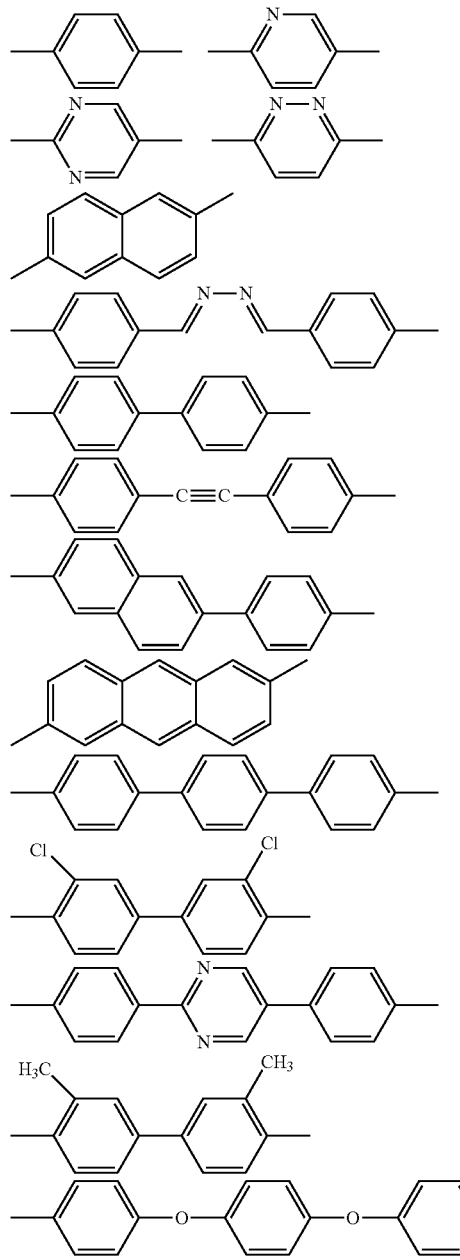

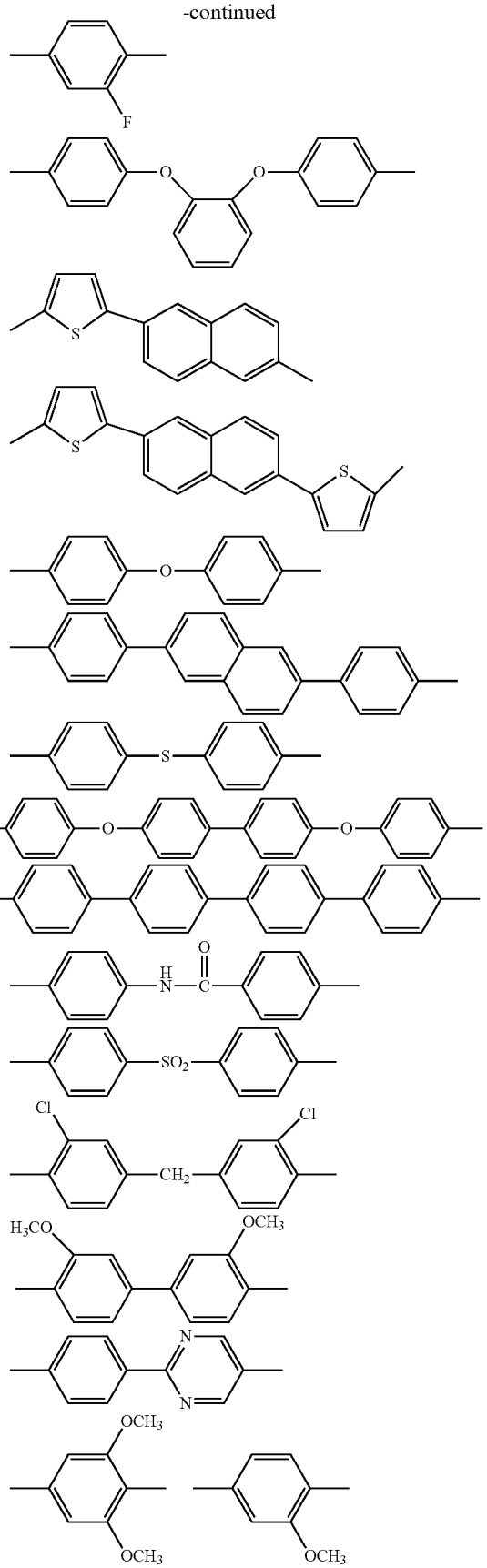

As the foregoing $A_{1w}$ and $A_{2w}$, a phenylene group optionally having a substituent represented by the following formula $(A_{11w})$ to which a substituent is optionally bonded, a biphenylene group optionally having a substituent represented by the following formula $(A_{21w})$ to which a substituent is optionally bonded, or a naphthylene group optionally having a substituent represented by the following formula $(A_{31w})$ to which a substituent is optionally bonded is preferable. Among these, a phenylene group optionally having a substituent represented by the following formula $(A_{11w})$ to which a substituent is optionally bonded is more preferable.

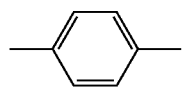

$(A_{11w})$

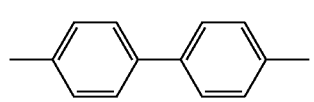

$(A_{21w})$

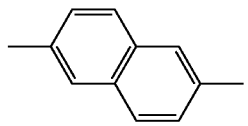

$(A_{31w})$

In the present invention, two groups represented by the following formulae in the polymerizable liquid crystal compound (iw) represented by the foregoing formula (Iw) may be the same as or different from each other.

$$Z_{1w}\mathrm{-\!\!-\!\!-\!\!\left[Y_{1w}\mathrm{-\!\!-\!\!-\!\!G_{1w}}\right]_{\overline{aw}}}\mathrm{-\!\!-\!\!Y_{2w}\mathrm{-\!\!-\!\!A_{1w}\mathrm{-\!\!-\!\!Y_{3w}\mathrm{-\!\!-}}}}$$

$$\mathrm{-\!\!-\!\!Y_{4w}\mathrm{-\!\!-\!\!A_{2w}\mathrm{-\!\!-\!\!Y_{5w}\mathrm{-\!\!-\!\!\left[G_{2w}\mathrm{-\!\!-\!\!Y_{6w}}\right]_{\overline{bw}}}\mathrm{-\!\!-\!\!Z_{2w}}}}}$$

Preferable specific examples of the polymerizable liquid crystal compound (iw) represented by the above formula (Iw) may include the following compounds, but the polymerizable liquid crystal compound (iw) in the present invention is not limited to these.

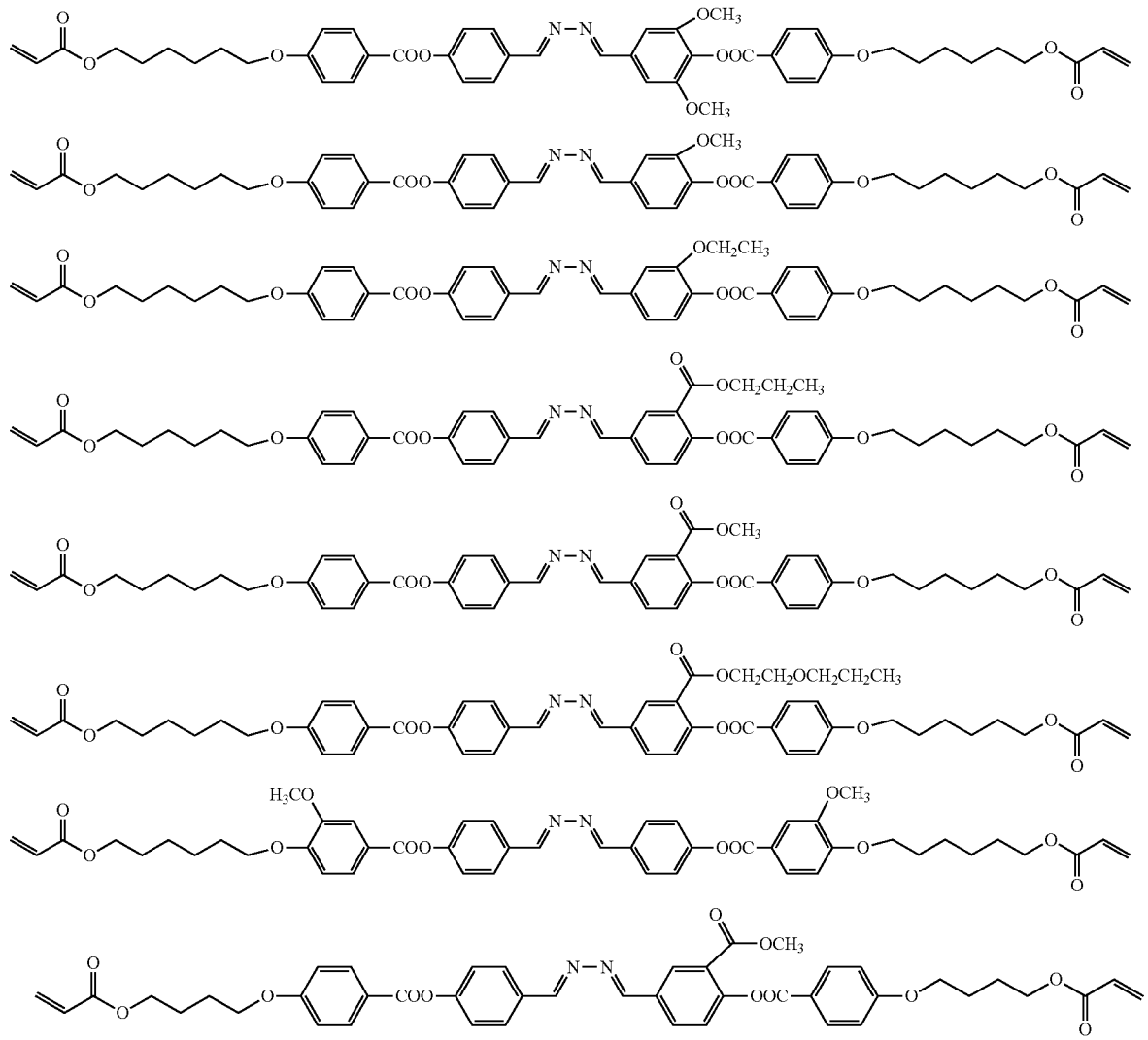

-continued

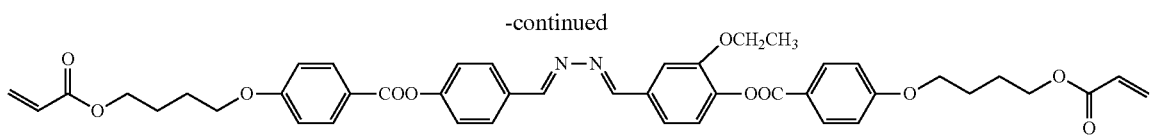

The polymerizable liquid crystal compound (iw) has a Δn value of preferably 0.05 or more, and more preferably 0.20 or more. When the compound has such a high Δn value, it is possible to provide a droplet-cured product having high optical performance (for example, a selective reflection function). The upper limit of Δn is not particularly limited, and may be, for example, 0.40, preferably 0.35.

The polymerizable liquid crystal compound (iw) may be produced by a known method described in the literature, such as WO2009/041512.

[4.1.2. Polymerizable Liquid Crystal Compound Usable in Combination with Polymerizable Liquid Crystal Compound (iw)]

The polymerizable liquid crystal compound (iw) may be used in combination with other polymerizable liquid crystal compounds. Examples of the polymerizable liquid crystal compounds that may be used in combination with the polymerizable liquid crystal compound (iw) may include known polymerizable liquid crystal compounds such as those described in Japanese Patent Application Laid-Open Nos. 11-130729 A, 8-104870 A, 2005-309255 A, 2005-263789 A, Japanese Translation of PCT Patent Application Publication No. 2002-533742 A, Japanese Patent Application Laid-Open Nos. 2002-308832 A, 2002-265421 A, 62-070406 A, and 11-100575 A.

As the polymerizable liquid crystal compound (iw) and the other polymerizable liquid crystal compounds described above, one type thereof may be solely used, and two or more types thereof may also be used in combination at any ratio. However, when the polymerizable liquid crystal compound (iw) and other polymerizable liquid crystal compound are used, the content of the polymerizable liquid crystal compound other than the polymerizable liquid crystal compound (iw) is preferably 50% by weight or less, and more preferably 30% by weight or less in the total amount of the polymerizable liquid crystal compounds.

[4.1.3. Polymerizable Compound (iiw)]

In the case where the cholesteric liquid crystal material contains the polymerizable liquid crystal compound (iw), the cholesteric liquid crystal material may contain a polymerizable compound other than the polymerizable liquid crystal compound. Preferable examples of such a polymerizable compound may include an achiral compound represented by the following formula (IIw). Hereinafter, this compound may be referred to as a polymerizable compound (iiw).

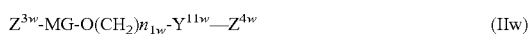

$Z^{3w}$-MG-O(CH$_2$)$n_{1w}$-Y$^{11w}$—Z$^{4w}$ (IIw)

In the above-described formula (IIw), $Z^{3W}$ represents a group selected from the group consisting of a hydrogen atom, an alkyl group of 1 to 2 carbon atoms optionally having a substituent, a halogen atom, a hydroxyl group, a carboxyl group, an amino group, and a cyano group. As the substituent when $Z^{3W}$ is an alkyl group having a substituent, a halogen atom may be mentioned. $Z^{3W}$ is preferably a cyano group.

MG represents a mesogen group selected from the group consisting of a 4,4'-biphenylene group, a 4,4'-bicyclohexylene group, a 2,6-naphthylene group, and a 4,4'-benzaldehyde azine group (—C$_6$H$_4$—CH═N—N═CH—C$_6$H$_4$—, where —C$_6$H$_4$— is a p-phenylene group). MG is preferably a 4,4'-biphenylene group.

$n_{1w}$ represents an integer of 0 to 6, and preferably an integer of 0 to 2.

$Y^{11w}$ represents a group selected from the group consisting of a single bond, —O—, —S—, —CO—, —CS—, —OCO—, —CH$_2$—, —OCH$_2$—, —NHCO—, —OCOO—, —CH$_2$COO—, and —CH$_2$OCO—. $Y^{11w}$ is preferably —OCO—.

$Z^{4W}$ represents an alkenyl group of 2 to 10 carbon atoms which may be substituted with a halogen atom. $Z^{4W}$ is preferably CH$_2$═CH—.

The Δn of the polymerizable compound (iiw) is preferably 0.18 or more, and may be more preferably 0.22 or more. When the polymerizable compound (iiw) has such a high Δn value, Δn as the cholesteric liquid crystal material can be improved, and a droplet-cured product having a broadband selective reflection function can be produced. The upper limit of Δn is not particularly limited, and may be, for example, 0.35, and preferably 0.30.

Specific preferable examples of the polymerizable compound (iiw) may include the following compounds (2-1w) to (2-4w).

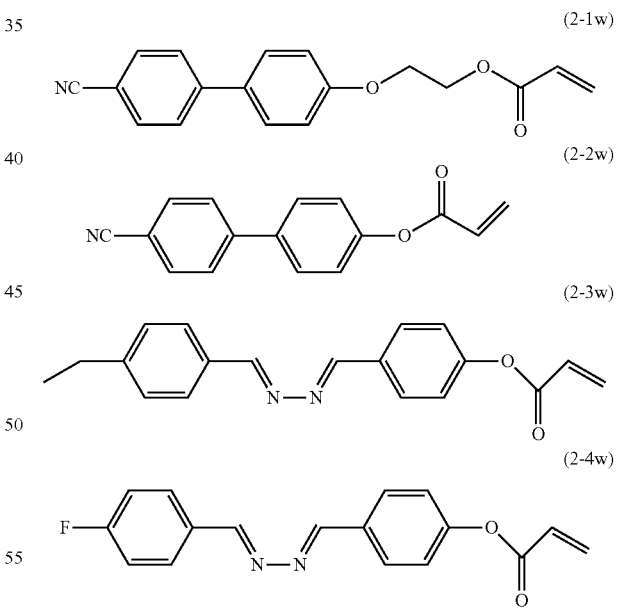

The method for producing a polymerizable compound (iiw) is not particularly limited, and the polymerizable compound (iiw) may be synthesized by methods known in the art, such as those described in Japanese Patent Application Laid-Open Nos. 62-70406 A and 11-100575 A.

When the cholesteric liquid crystal material contains the polymerizable liquid crystal compound (iw) and the polymerizable compound (iiw), the weight ratio of (the total weight of the polymerizable compound (iiw))/(the total weight of the polymerizable liquid crystal compound (iw)) is preferably 0.05 to 1, more preferably 0.1 to 0.65, and even more preferably 0.15 to 0.45. When the weight ratio is set to 0.05 or more, orientation uniformity can be enhanced. On the contrary, when the weight ratio is set to 1 or less, the orientation uniformity can be enhanced, the stability of the liquid crystal phase can be enhanced, Δn as the cholesteric liquid crystal material can be set to a high value, and desired optical performance (for example, selective reflection function) can be satisfactorily obtained. The total weight indicates its weight when one type thereof is used, and the total weight when two or more types thereof are used.

In the cholesteric liquid crystal material, the molecular weight of the polymerizable compound (iiw) is preferably less than 600 and the molecular weight of the polymerizable liquid crystal compound (iw) is preferably 600 or more. When the molecular weight of the polymerizable compound (iiw) is less than 600, the polymerizable compound (iiw) can enter into the gap of the rod-shaped liquid crystal compound having a larger molecular weight, and the orientation uniformity can be improved. The molecular weight of the polymerizable liquid crystal compound (iw) may be more preferably 750 to 950. The molecular weight of the polymerizable compound (iiw) may be more preferably 250 to 450.

[4.1.4. Polymerizable Chiral Compound]

In the case where the cholesteric liquid crystal material contains the polymerizable liquid crystal compound (iw), the cholesteric liquid crystal material may further contain a polymerizable chiral compound. As the polymerizable chiral compound, a compound which has a chiral carbon atom in the molecule, is polymerizable with the polymerizable liquid crystal compound and does not disturb the orientation of the polymerizable liquid crystal compound may be appropriately selected for use. By mixing the polymerizable liquid crystal compound (iw) described above with a polymerizable chiral compound, the compound (iw) can express a cholesteric phase.

Herein, the term "polymerization" is intended to mean a chemical reaction in a broad sense including a crosslinking reaction in addition to a normal polymerization reaction.

In the liquid crystal composition, one type of the polymerizable chiral compound may be solely used, and two or more types thereof may also be used in combination.

Examples of the polymerizable chiral compound may include those known as described in Japanese Patent Application Laid-Open Nos. 11-193287 A and 2003-137887 A in addition to those commercially available (for example, "LC756" manufactured by BASF Corporation). Examples of such chiral compounds may include, but are not limited to, compounds represented by the following three general formulae:

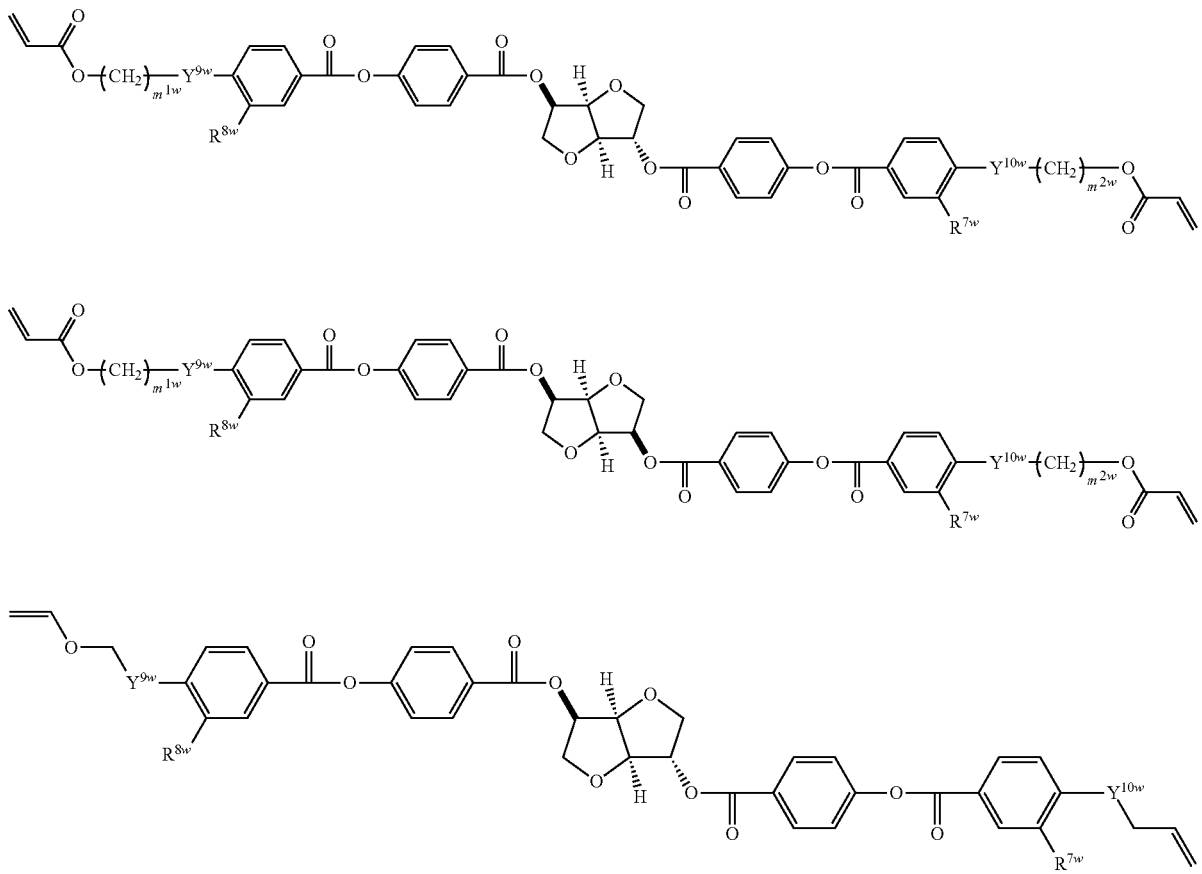

In the above-described formulae, examples of $R^{6w}$ and $R^{7w}$ may include a hydrogen atom, a methyl group, and a methoxy group. Examples of $Y^{9w}$ and $Y^{10w}$ may include —O—, —O—C(=O)—, and —O—C(=O)—O—. Further, $m^{1w}$ and $m^{2w}$ are each independently 2, 4, or 6. Specific examples of the compounds represented by these general formulae may include the compounds shown below.

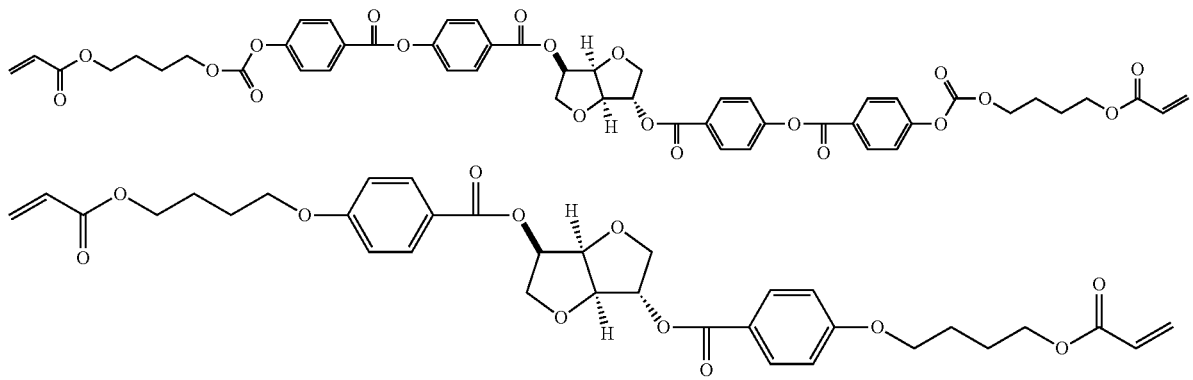

When the cholesteric liquid crystal material contains the polymerizable liquid crystal compound (iw) and a polymerizable chiral compound, the mixing ratio of the polymerizable chiral compound is usually 0.1 to 100 parts by weight, and preferably 0.5 to 10 parts by weight, relative to 100 parts by weight of the polymerizable liquid crystal compound (iw).

[4.2. Compound (i)]

The compound (i) is a compound exhibiting a liquid crystal property represented by the following formula (I).

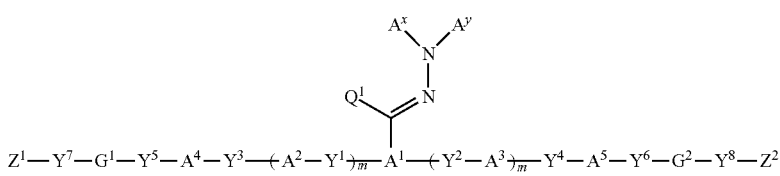

In the above-described formula (I), $Y^1$ to $Y^8$ each independently represent a chemical single bond, —O—, —S—, —O—C(=O)—, —C(=O)—O—, —O—C(=O)—O—, —NR$^1$—C(=O)—, —C(=O)—NR$^1$—, —O—C(=O)—NR$^1$—, —NR$^1$—C(=O)—O—, —NR$^1$—C(=O)—NR$^1$—, —O—NR$^1$—, or —NR$^1$—O—.

Herein, $R^1$ is a hydrogen atom or an alkyl group of 1 to 6 carbon atoms.

Examples of the alkyl group of 1 to 6 carbon atoms of $R^1$ may include a methyl group, an ethyl group, a n-propyl group, an isopropyl group, a n-butyl group, a sec-butyl group, a t-butyl group, a n-pentyl group, and a n-hexyl group.

It is preferable that $R^1$ is a hydrogen atom or an alkyl group of 1 to 4 carbon atoms.

In the compound (i), it is preferable that $Y^1$ to $Y^8$ are each independently a chemical single bond, —O—, —O—C(=O)—, —C(=O)—O—, or —O—C(=O)—O—.

In the formula (I) mentioned above, $G^1$ and $G^2$ are each independently a divalent aliphatic group of 1 to 20 carbon atoms optionally having a substituent.

Examples of the divalent aliphatic group of 1 to 20 carbon atoms may include a divalent aliphatic group having a linear structure, such as an alkylene group of 1 to 20 carbon atoms and an alkenylene group of 2 to 20 carbon atoms; and a divalent aliphatic group, such as a cycloalkanediyl group of 3 to 20 carbon atoms, a cycloalkenediyl group of 4 to 20 carbon atoms, and a divalent alicyclic fused ring group of 10 to 30 carbon atoms.

Examples of the substituent in the divalent aliphatic group of $G^1$ and $G^2$ may include a halogen atom, such as a fluorine atom, a chlorine atom, a bromine atom, and an iodine atom; and an alkoxy group of 1 to 6 carbon atoms, such as a methoxy group, an ethoxy group, a n-propoxy group, an isopropoxy group, a n-butoxy group, a sec-butoxy group, a t-butoxy group, a n-pentyloxy group, and a n-hexyloxy group. Among these, a fluorine atom, a methoxy group, and an ethoxy group are preferable.

The aforementioned aliphatic groups may have one or more per one aliphatic group of —O—, —S—, —O—C(=O)—, —C(=O)—O—, —O—C(=O)—O—, —NR$^2$—C(=O)—, —C(=O)—NR$^2$—, —NR$^2$—, or —C(=O)— inserted therein. However, cases where two or more —O— or —S— are adjacently inserted are excluded. Herein, $R^2$ is a hydrogen atom or an alkyl group of 1 to 6 carbon atoms. It is preferable that $R^2$ is a hydrogen atom or a methyl group.

It is preferable that the group inserted into the aliphatic groups is —O—, —O—C(=O)—, —C(=O)—O—, or —C(=O)—.

Specific examples of the aliphatic groups into which the group is inserted may include —CH$_2$—CH$_2$—O—CH$_2$—CH$_2$—, —CH$_2$—CH$_2$—S—CH$_2$—CH$_2$-, —CH$_2$-CH$_2$-O—C(=O)—CH$_2$-CH$_2$-, —CH$_2$-CH$_2$-C(=O)—O—CH$_2$—CH$_2$—, —CH$_2$—CH$_2$—C(=O)—O—CH$_2$—, —CH$_2$—O—C(=O)—O—CH$_2$—CH$_2$—, —CH$_2$—CH$_2$—NR$^2$—C(=O)—CH$_2$—CH$_2$—, —CH$_2$—CH$_2$—C(=O)—NR$^2$—CH$_2$—, —CH$_2$—NR$^2$—CH$_2$—CH$_2$—, and —CH$_2$—C(=O)—CH$_2$—.

Among these, from the viewpoint of more favorably expressing the desired effect of the present invention, $G^1$ and $G^2$ are each independently preferably a divalent aliphatic group having a linear structure, such as an alkylene group of 1 to 20 carbon atoms and an alkenylene group of 2 to 20 carbon atoms, more preferably an alkylene group of 1 to 12 carbon atoms, such as a methylene group, an ethylene group, a trimethylene group, a propylene group, a tetramethylene group, a pentamethylene group, a hexamethylene group, an octamethylene group, and a decamethylene group [—(CH$_2$)$_{10}$—], and particularly preferably a tetramethylene group [—(CH$_2$)$_4$—], a hexamethylene group [—(CH$_2$)$_6$—], an octamethylene group [—(CH$_2$)$_8$—], or a decamethylene group [—(CH$_2$)$_{10}$—].

In the formula (I) mentioned above, $Z^1$ and $Z^2$ are each independently an alkenyl group of 2 to 10 carbon atoms that may be substituted by a halogen atom.

It is preferable that the number of carbon atoms in the alkenyl group is 2 to 6. Examples of the halogen atom that is a substituent in the alkenyl group of $Z^1$ and $Z^2$ may include a fluorine atom, a chlorine atom, and a bromine atom. A chlorine atom is preferable.

Specific examples of the alkenyl group of 2 to 10 carbon atoms of $Z^1$ and $Z^2$ may include CH$_2$=CH—, CH$_2$=C(CH$_3$)—, CH$_2$=CH—CH$_2$—, CH$_3$—CH=CH—, CH$_2$=CH—CH$_2$—CH$_2$—, CH$_2$=C(CH$_3$)—CH$_2$—CH$_2$—, (CH$_3$)$_2$C=CH—CH$_2$—, (CH$_3$)$_2$C=CH—CH$_2$—CH$_2$—, CH$_2$=C(Cl)—, CH$_2$=C(CH$_3$)—CH$_2$—, and CH$_3$—CH=CH—CH$_2$—.

Among these, from the viewpoint of favorably expressing the desired effect of the present invention, $Z^1$ and $Z^2$ are each independently preferably CH$_2$=CH—, CH$_2$=C(CH$_3$)—, CH$_2$=C(Cl)—, CH$_2$=CH—CH$_2$—, CH$_2$=C(CH$_3$)—CH$_2$—, or CH$_2$=C(CH$_3$)—CH$_2$—CH$_2$—, more preferably CH$_2$=CH—, CH$_2$=C(CH$_3$)— or CH$_2$=C(Cl)—, and particularly preferably CH$_2$=CH—.

In the formula (I) mentioned above, $A^x$ is an organic group of 2 to 30 carbon atoms having at least one aromatic ring selected from the group consisting of an aromatic hydrocarbon ring and an aromatic heterocyclic ring. The "aromatic ring" means a cyclic structure having aromaticity in the broad sense based on Huckel rule, that is, a cyclic conjugated structure having (4n+2) π electrons, and a cyclic structure that exhibits aromaticity by involving a lone electron pair of electrons of a heteroatom, such as sulfur, oxygen, and nitrogen, in a π electron system, typified by thiophene, furan, and benzothiazole.

The organic group of 2 to 30 carbon atoms having at least one aromatic ring selected from the group consisting of an aromatic hydrocarbon ring and an aromatic heterocyclic ring, of $A^x$, may have a plurality of aromatic rings, or have both an aromatic hydrocarbon ring and an aromatic heterocyclic ring.

Examples of the aromatic hydrocarbon ring may include a benzene ring, a naphthalene ring, and an anthracene ring. Examples of the aromatic heterocyclic ring may include a monocyclic aromatic heterocyclic ring, such as a pyrrole ring, a furan ring, a thiophene ring, a pyridine ring, a pyridazine ring, a pyrimidine ring, a pyrazine ring, a pyrazole ring, an imidazole ring, an oxazole ring, and a thiazole ring; and a fused aromatic heterocyclic ring, such as a benzothiazole ring, a benzoxazole ring, a quinoline ring, a phthalazine ring, a benzimidazole ring, a benzopyrazole ring, a benzofuran ring, a benzothiophene ring, a thiazolopyridine ring, an oxazolopyridine ring, a thiazolopyrazine ring, an oxazolopyrazine ring, a thiazolopyridazine ring, an oxazolopyridazine ring, a thiazolopyrimidine ring, and an oxazolopyrimidine ring.

The aromatic ring of $A^x$ may have a substituent. Examples of the substituent may include a halogen atom, such as a fluorine atom and a chlorine atom; a cyano group; an alkyl group of 1 to 6 carbon atoms, such as a methyl group, an ethyl group, and a propyl group; an alkenyl group of 2 to 6 carbon atoms, such as a vinyl group and an allyl group; a halogenated alkyl group of 1 to 6 carbon atoms, such as a trifluoromethyl group; a substituted amino group, such as a dimethylamino group; an alkoxy group of 1 to 6 carbon atoms, such as a methoxy group, an ethoxy group, and an isopropoxy group; a nitro group; an aryl group, such as a phenyl group and a naphthyl group; —C(=O)—R$^5$; —C(=O)—OR$^5$; and —SO$_2$R$^6$. Herein, R$^5$ is an alkyl group of 1 to 20 carbon atoms, an alkenyl group of 2 to 20 carbon atoms, or a cycloalkyl group of 3 to 12 carbon atoms. R$^6$ is an alkyl group of 1 to 20 carbon atoms, an alkenyl group of 2 to 20 carbon atoms, a phenyl group, or a 4-methylphenyl group, which are the same as those for R$^4$ which will be described later.

The aromatic ring of $A^x$ may have a plurality of substituents that may be the same or different, and two adjacent substituents may be bonded together to form a ring. The formed ring may be a monocycle or a fused polycycle, and may be an unsaturated ring or a saturated ring.

The "number of carbon atoms" in the organic group of 2 to 30 carbon atoms of $A^x$ means the total number of carbon atoms in the entire organic group which excludes carbon atoms in the substituents (the same applies to $A^y$ which will be described later).

Examples of the organic group of 2 to 30 carbon atoms having at least one aromatic ring selected from the group consisting of an aromatic hydrocarbon ring and an aromatic heterocyclic ring, of $A^x$, may include an aromatic hydrocarbon ring group such as a benzene ring group, a naphthalene ring group, and an anthracene ring group; an aromatic heterocyclic ring group such as a pyrrole ring group, a furan ring group, a thiophene ring group, a pyridine ring group, a pyridazine ring group, a pyrimidine ring group, a pyrazine ring group, a pyrazole ring group, an imidazole ring group, an oxazole ring group, a thiazole ring group, a benzothiazole ring group, a benzoxazole ring group, a quinoline ring group, a phthalazine ring group, a benzimidazole ring group, a benzopyrazole ring group, a benzofuran ring group, a benzothiophene ring group, a thiazolopyridine ring group, an oxazolopyridine ring group, a thiazolopyrazine ring group, an oxazolopyrazine ring group, a thiazolopyridazine ring group, an oxazolopyridazine ring group, a thiazolopyrimidine ring group, and an oxazolopyrimidine ring group; a group containing a combination of an aromatic hydrocarbon ring and a heterocyclic ring; an alkyl group of 3 to 30 carbon atoms having at least one aromatic ring selected from the group consisting of an aromatic hydrocarbon ring and an aromatic heterocyclic ring; an alkenyl group of 4 to 30 carbon atoms having at least one aromatic ring selected from the group consisting of an aromatic hydrocarbon ring and an aromatic heterocyclic ring; and an alkynyl group of 4 to 30 carbon atoms having at least one aromatic ring selected from the group consisting of an aromatic hydrocarbon ring and an aromatic heterocyclic ring.

Preferable specific examples of $A^x$ are as follows. However, $A^x$ is not limited to the following examples. In the following formulae, "—" represents an atomic bonding at any position of the ring (the same applies to the following).

(1) An Aromatic Hydrocarbon Ring Group

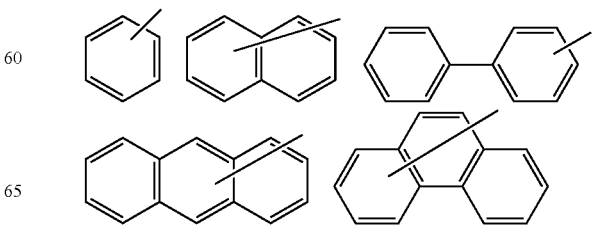

-continued

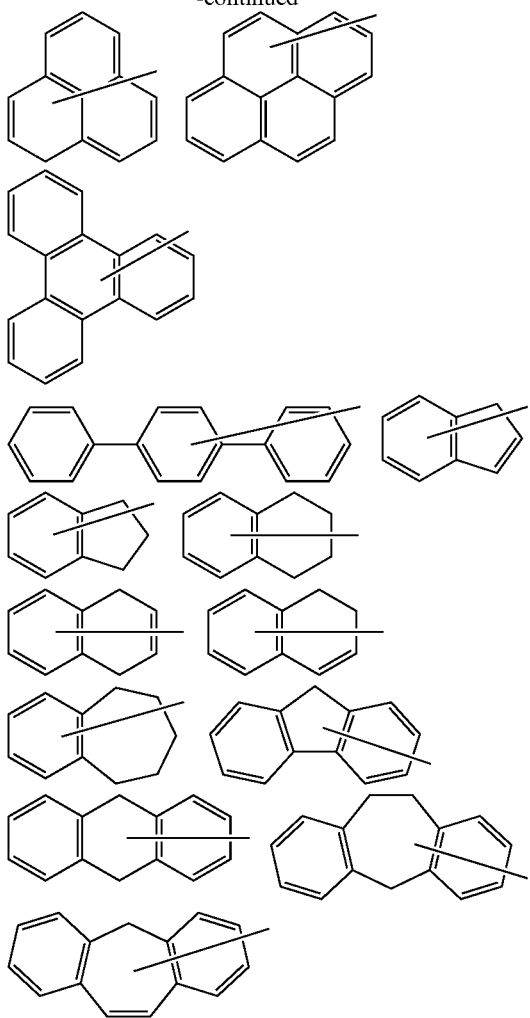

(2) An Aromatic Heterocyclic Group

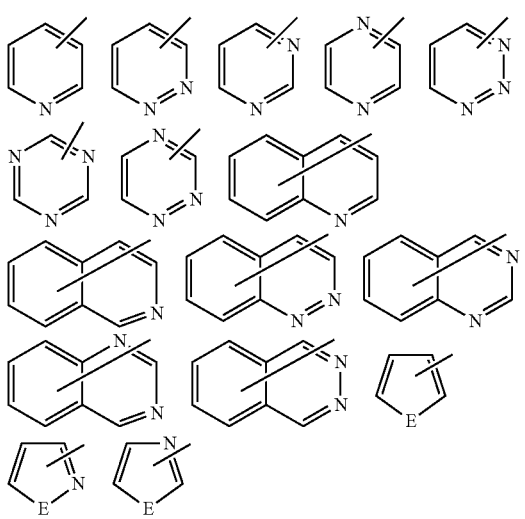

In the aforementioned formulae, E is $NR^{6a}$, an oxygen atom, or a sulfur atom. Herein, $R^{6a}$ is a hydrogen atom; or an alkyl group of 1 to 6 carbon atoms, such as a methyl group, an ethyl group, and a propyl group.

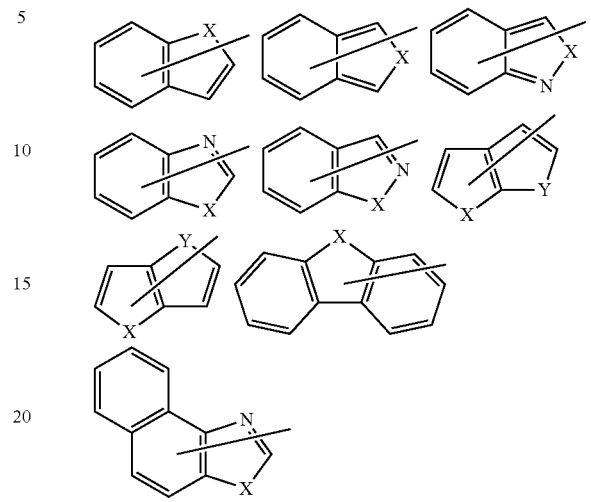

In the aforementioned formulae, X and Y are each independently $NR^7$, an oxygen atom, a sulfur atom, —SO—, or —SO$_2$— (with a proviso that cases where an oxygen atom, a sulfur atom, —SO—, and —SO$_2$— are each adjacent are excluded). $R^7$ is a hydrogen atom, or an alkyl group of 1 to 6 carbon atoms, such as a methyl group, an ethyl group, and a propyl group, which are the same as those for $R^{6a}$ described above.

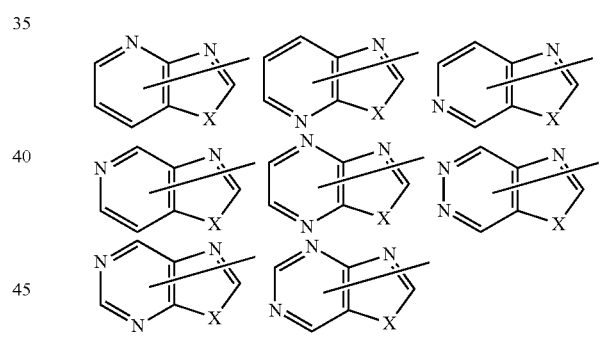

(In the aforementioned formulae, X has the same meanings as described above.)

(3) A Group Containing a Combination of an Aromatic Hydrocarbon Ring and a Heterocyclic Ring

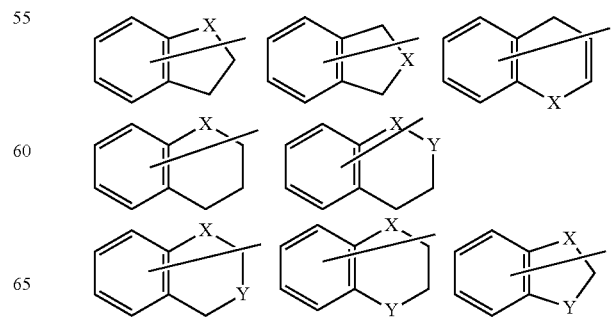

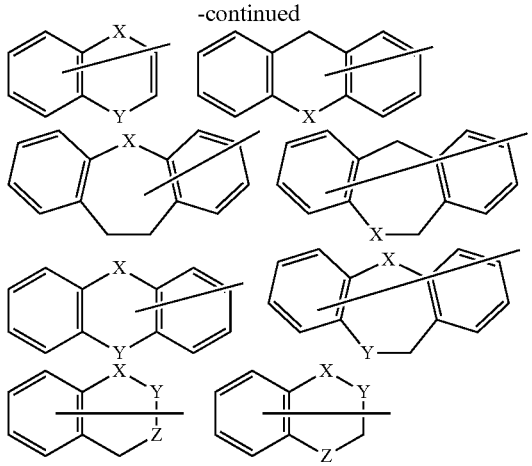

(In the aforementioned formulae, each of X and Y independently has the same meanings as described above. In the aforementioned formulae, Z represents $NR^7$, an oxygen atom, a sulfur atom, —SO—, or —$SO_2$— (with a proviso that cases where an oxygen atom, a sulfur atom, —SO—, and —$SO_2$— are each adjacent are excluded.).)

(4) An alkyl group having at least one aromatic ring selected from the group consisting of an aromatic hydrocarbon ring and an aromatic heterocyclic ring

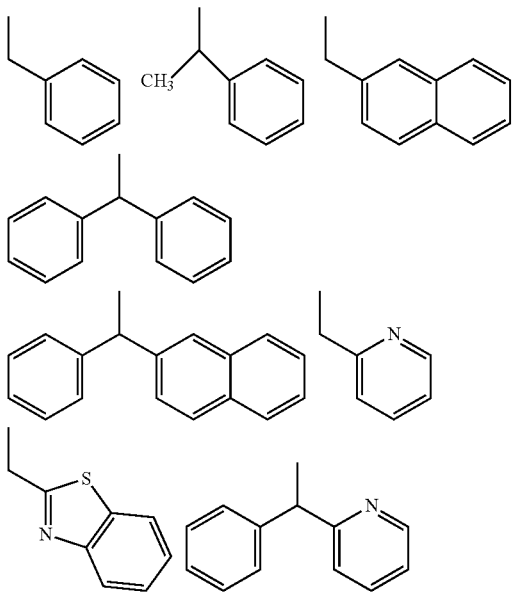

(5) An Alkenyl Group Having at Least One Aromatic Ring Selected from the Group Consisting of an Aromatic Hydrocarbon Ring and an Aromatic Heterocyclic Ring

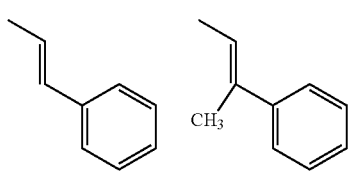

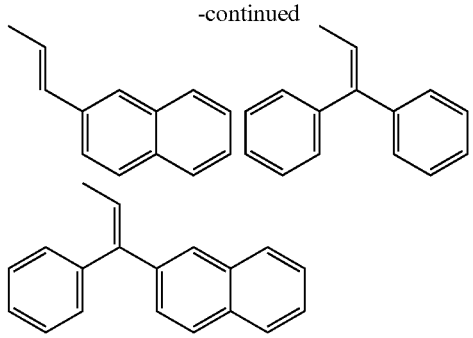

(6) An Alkynyl Group Having at Least One Aromatic Ring Selected from the Group Consisting of an Aromatic Hydrocarbon Ring and an Aromatic Heterocyclic Ring

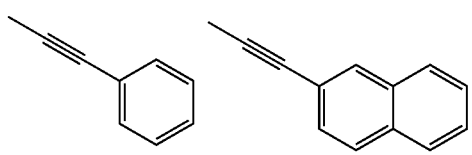

Of $A^x$ described above, an aromatic hydrocarbon ring group of 6 to 30 carbon atoms, an aromatic heterocyclic group of 4 to 30 carbon atoms, and a group of 4 to 30 carbon atoms containing a combination of an aromatic hydrocarbon ring group and a heterocyclic ring are preferable, and any of the groups shown below are more preferable.

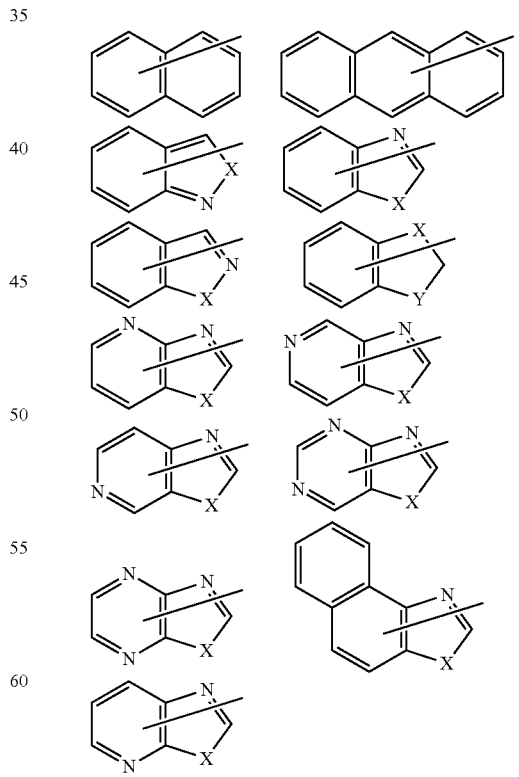

It is further preferable that $A^x$ is any of the following groups.

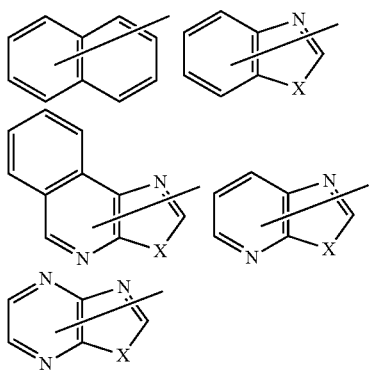

The ring that $A^x$ has may have a substituent. Examples of such a substituent may include a halogen atom, such as a fluorine atom and a chlorine atom; a cyano group; an alkyl group of 1 to 6 carbon atoms, such as a methyl group, an ethyl group, and a propyl group; an alkenyl group of 2 to 6 carbon atoms, such as a vinyl group and an allyl group; a halogenated alkyl group of 1 to 6 carbon atoms, such as a trifluoromethyl group; a substituted amino group, such as a dimethylamino group; an alkoxy group of 1 to 6 carbon atoms, such as a methoxy group, an ethoxy group, and an isopropoxy group; a nitro group; an aryl group, such as a phenyl group and a naphthyl group; —C(=O)—$R^8$; —C(=O)—$OR^8$; and —$SO_2R^6$. Herein, $R^8$ is an alkyl group of 1 to 6 carbon atoms, such as a methyl group and an ethyl group; or an aryl group of 6 to 14 carbon atoms, such as a phenyl group. In particular, it is preferable that the substituent is a halogen atom, a cyano group, an alkyl group of 1 to 6 carbon atoms, or an alkoxy group of 1 to 6 carbon atoms.

The ring that $A^x$ has may have a plurality of substituents that may be the same or different, and two adjacent substituents may be bonded together to form a ring. The formed ring may be a monocycle or a fused polycycle.

The "number of carbon atoms" in the organic group of 2 to 30 carbon atoms of $A^x$ means the total number of carbon atoms in the entire organic group which excludes carbon atoms in the substituents (the same applies to $A^y$ which will be described later).

In the aforementioned formula (I), $A^y$ is a hydrogen atom, an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, an alkynyl group of 2 to 20 carbon atoms optionally having a substituent, —C(=O)—$R^3$, —$SO_2$—$R^4$, —C(=S)NH—$R^9$, or an organic group of 2 to 30 carbon atoms having at least one aromatic ring selected from the group consisting of an aromatic hydrocarbon ring and an aromatic heterocyclic ring. Herein, $R^3$ is an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic hydrocarbon ring group of 5 to 12 carbon atoms. $R^4$ is an alkyl group of 1 to 20 carbon atoms, an alkenyl group of 2 to 20 carbon atoms, a phenyl group, or a 4-methylphenyl group. $R^9$ is an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic group of 5 to 20 carbon atoms optionally having a substituent.

Examples of the alkyl group of 1 to 20 carbon atoms in the alkyl group of 1 to 20 carbon atoms optionally having a substituent, of $A^y$, may include a methyl group, an ethyl group, a n-propyl group, an isopropyl group, a n-butyl group, an isobutyl group, a 1-methylpentyl group, a 1-ethylpentyl group, a sec-butyl group, a t-butyl group, a n-pentyl group, an isopentyl group, a neopentyl group, a n-hexyl group, an isohexyl group, a n-heptyl group, a n-octyl group, a n-nonyl group, a n-decyl group, a n-undecyl group, a n-dodecyl group, a n-tridecyl group, a n-tetradecyl group, a n-pentadecyl group, a n-hexadecyl group, a n-heptadecyl group, a n-octadecyl group, a n-nonadecyl group, and a n-icosyl group. The number of carbon atoms in the alkyl group of 1 to 20 carbon atoms optionally having a substituent is preferably 1 to 12, and further preferably 4 to 10.

Examples of the alkenyl group of 2 to 20 carbon atoms in the alkenyl group of 2 to 20 carbon atoms optionally having a substituent, of $A^y$, may include a vinyl group, a propenyl group, an isopropenyl group, a butenyl group, an isobutenyl group, a pentenyl group, a hexenyl group, a heptenyl group, an octenyl group, a decenyl group, an undecenyl group, a dodecenyl group, a tridecenyl group, a tetradecenyl group, a pentadecenyl group, a hexadecenyl group, a heptadecenyl group, an octadecenyl group, a nonadecenyl group, and an icocenyl group. The number of carbon atoms in the alkenyl group of 2 to 20 carbon atoms optionally having a substituent is preferably 2 to 12.

Examples of the cycloalkyl group of 3 to 12 carbon atoms in the cycloalkyl group of 3 to 12 carbon atoms optionally having a substituent, of $A^y$, may include a cyclopropyl group, a cyclobutyl group, a cyclopentyl group, a cyclohexyl group, and a cyclooctyl group.

Examples of the alkynyl group of 2 to 20 carbon atoms in the alkynyl group of 2 to 20 carbon atoms optionally having a substituent, of $A^y$, may include an ethynyl group, a propynyl group, a 2-propynyl group (propargyl group), a butynyl group, a 2-butynyl group, a 3-butynyl group, a pentynyl group, a 2-pentynyl group, a hexynyl group, a 5-hexynyl group, a heptynyl group, an octynyl group, a 2-octynyl group, a nonanyl group, a decanyl group, and a 7-decanyl group.

Examples of the substituents in the alkyl group of 1 to 20 carbon atoms optionally having a substituent and the alkenyl group of 2 to 20 carbon atoms optionally having a substituent, of $A^y$, may include a halogen atom, such as a fluorine atom and a chlorine atom; a cyano group; a substituted amino group, such as a dimethylamino group; an alkoxy group of 1 to 20 carbon atoms, such as a methoxy group, an ethoxy group, an isopropyl group, and a butoxy group; an alkoxy group of 1 to 12 carbon atoms that is substituted by an alkoxy group of 1 to 12 carbon atoms, such as a methoxymethoxy group and a methoxyethoxy group; a nitro group; an aryl group, such as a phenyl group and a naphthyl group; a cycloalkyl group of 3 to 8 carbon atoms, such as a cyclopropyl group, a cyclopentyl group, and a cyclohexyl group; a cycloalkyloxy group of 3 to 8 carbon atoms, such as a cyclopentyloxy group, and a cyclohexyloxy group; a cyclic ether group of 2 to 12 carbon atoms, such as a tetrahydrofuranyl group, a tetrahydropyranyl group, a dioxolanyl group, and a dioxanyl group; an aryloxy group of 6 to 14 carbon atoms, such as a phenoxy group, and a naphthoxy group; a fluoroalkoxy group of 1 to 12 carbon atoms in which at least one is substituted by a fluoro atom, such as a trifluoromethyl group, a pentafluoroethyl group, and —$CH_2CF_3$; a benzofuryl group; a benzopyranyl group;

a benzodioxolyl group; a benzodioxanyl group; —C(=O)—$R^{7a}$; —C(=O)—$OR^{7a}$; —$SO_2R^{8a}$; —$SR^{10}$; an alkoxy group of 1 to 12 carbon atoms substituted by —$SR^{10}$; and a hydroxyl group. Herein, $R^{7a}$ and $R^{10}$ are each independently an alkyl group of 1 to 20 carbon atoms, an alkenyl group of 2 to 20 carbon atoms, a cycloalkyl group of 3 to 12 carbon atoms, or an aromatic hydrocarbon ring group of 6 to 12 carbon atoms. $R^{8a}$ is an alkyl group of 1 to 20 carbon atoms, an alkenyl group of 2 to 20 carbon atoms, a phenyl group, or a 4-methylphenyl group, which are the same as those for $R^4$ described above.

Examples of the substituent in the cycloalkyl group of 3 to 12 carbon atoms optionally having a substituent, of $A^y$, may include a halogen atom, such as a fluorine atom and a chlorine atom; a cyano group; a substituted amino group, such as a dimethylamino group; an alkyl group of 1 to 6 carbon atoms, such as a methyl group, an ethyl group, and a propyl group; an alkoxy group of 1 to 6 carbon atoms, such as a methoxy group, an ethoxy group, and an isopropoxy group; a nitro group; an aryl group, such as a phenyl group and a naphthyl group; a cycloalkyl group of 3 to 8 carbon atoms, such as a cyclopropyl group, a cyclopentyl group, and a cyclohexyl group; —C(=O)—$R^{7a}$; —C(=O)—$OR^{7a}$; —$SO_2R^{8a}$; and a hydroxyl group. Herein, $R^{7a}$ and $R^{8a}$ have the same meanings as described above.

Examples of the substituent in the alkynyl group of 2 to 20 carbon atoms optionally having a substituent, of $A^y$, may include substituents that are the same as the substituents in the alkyl group of 1 to 20 carbon atoms optionally having a substituent and the alkenyl group of 2 to 20 carbon atoms optionally having a substituent.

In the group represented by —C(=O)—$R^3$ of $A^y$, $R^3$ is an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic hydrocarbon ring group of 5 to 12 carbon atoms. Specific examples thereof may include those exemplified as the examples of the alkyl group of 1 to 20 carbon atoms optionally having a substituent, the alkenyl group of 2 to 20 carbon atoms optionally having a substituent, and the cycloalkyl group of 3 to 12 carbon atoms optionally having a substituent, of $A^y$; and the aromatic hydrocarbon ring group of 5 to 12 carbon atoms, among the aromatic hydrocarbon ring groups described in $A^x$ described above.

In the group represented by —$SO_2$—$R^4$ of $A^y$, $R^4$ is an alkyl group of 1 to 20 carbon atoms, an alkenyl group of 2 to 20 carbon atoms, a phenyl group, or a 4-methylphenyl group. Specific examples of the alkyl group of 1 to 20 carbon atoms and the alkenyl group of 2 to 20 carbon atoms, of $R^4$, may include those exemplified as the examples of the alkyl group of 1 to 20 carbon atoms, and the alkenyl group of 2 to 20 carbon atoms, of $A^y$ described above.

In the group represented by —C(=S)NH—$R^9$ of $A^y$, $R^9$ is an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, or an aromatic group of 5 to 20 carbon atoms optionally having a substituent. Specific examples thereof may include those exemplified as the examples of the alkyl group of 1 to 20 carbon atoms optionally having a substituent, the alkenyl group of 2 to 20 carbon atoms optionally having a substituent, and the cycloalkyl group of 3 to 12 carbon atoms optionally having a substituent, of $A^y$ described above; and the aromatic hydrocarbon ring group of 5 to 20 carbon atoms and aromatic heteroaromatic ring group of 5 to 20 carbon atoms, among the aromatic groups such as the aromatic hydrocarbon ring groups and aromatic heteroaromatic ring groups described in $A^x$ described above.

Examples of the organic group of 2 to 30 carbon atoms having at least one aromatic ring selected from the group consisting of an aromatic hydrocarbon ring and an aromatic heterocyclic ring of $A^y$ may include those exemplified as the examples of $A^x$ described above.

Among these, $A^y$ is preferably a hydrogen atom, an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, an alkynyl group of 2 to 20 carbon atoms optionally having a substituent, —C(=O)—$R^3$, —$SO_2$—$R^4$, or an organic group of 2 to 30 carbon atoms having at least one aromatic ring selected from the group consisting of an aromatic hydrocarbon ring and an aromatic heterocyclic ring, and further preferably a hydrogen atom, an alkyl group of 1 to 20 carbon atoms optionally having a substituent, an alkenyl group of 2 to 20 carbon atoms optionally having a substituent, a cycloalkyl group of 3 to 12 carbon atoms optionally having a substituent, an alkynyl group of 2 to 20 carbon atoms optionally having a substituent, an aromatic hydrocarbon ring group of 6 to 12 carbon atoms optionally having a substituent, an aromatic heterocyclic group of 3 to 9 carbon atoms optionally having a substituent, an group of 3 to 9 carbon atoms containing a combination of an aromatic hydrocarbon ring and a heterocyclic ring and optionally having a substituent, or a group represented by —C(=O)—$R^3$ or —$SO_2$—$R^4$. Herein, $R^3$ and $R^4$ have the same meanings as described above.

It is preferable that substituents in the alkyl group of 1 to 20 carbon atoms optionally having a substituent, the alkenyl group of 2 to 20 carbon atoms optionally having a substituent, and the alkynyl group of 2 to 20 carbon atoms optionally having a substituent, of $A^y$, are a halogen atom, a cyano group, an alkoxy group of 1 to 20 carbon atoms, an alkoxy group of 1 to 12 carbon atoms that is substituted by an alkoxy group of 1 to 12 carbon atoms, a phenyl group, a cyclohexyl group, a cyclic ether group of 2 to 12 carbon atoms, an aryloxy group of 6 to 14 carbon atoms, a hydroxyl group, a benzodioxanyl group, a phenylsulfonyl group, a 4-methylphenylsulfonyl group, a benzoyl group, or —$SR^{10}$. Herein, $R^{10}$ has the same meanings as described above.

It is preferable that substituents in the cycloalkyl group of 3 to 12 carbon atoms optionally having a substituent, the aromatic hydrocarbon ring group of 6 to 12 carbon atoms optionally having a substituent, the aromatic heterocyclic group of 3 to 9 carbon atoms optionally having a substituent, and an group of 3 to 9 carbon atoms containing a combination of an aromatic hydrocarbon ring and a heterocyclic ring and optionally having a substituent, of $A^y$, are a fluorine atom, an alkyl group of 1 to 6 carbon atoms, an alkoxy group of 1 to 6 carbon atoms, or a cyano group.

$A^x$ and $A^y$ may form a ring together. Examples of the ring may include an unsaturated heterocyclic ring of 4 to 30 carbon atoms optionally having a substituent and an unsaturated carbon ring of 6 to 30 carbon atoms optionally having a substituent.

The aforementioned unsaturated heterocyclic ring of 4 to 30 carbon atoms and the aforementioned unsaturated carbon ring of 6 to 30 carbon atoms are not particularly restricted, and may or may not have aromaticity.

Examples of the ring formed by $A^x$ and $A^y$ together may include rings shown below. The rings shown below are a moiety of:

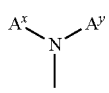

in the formula (I).

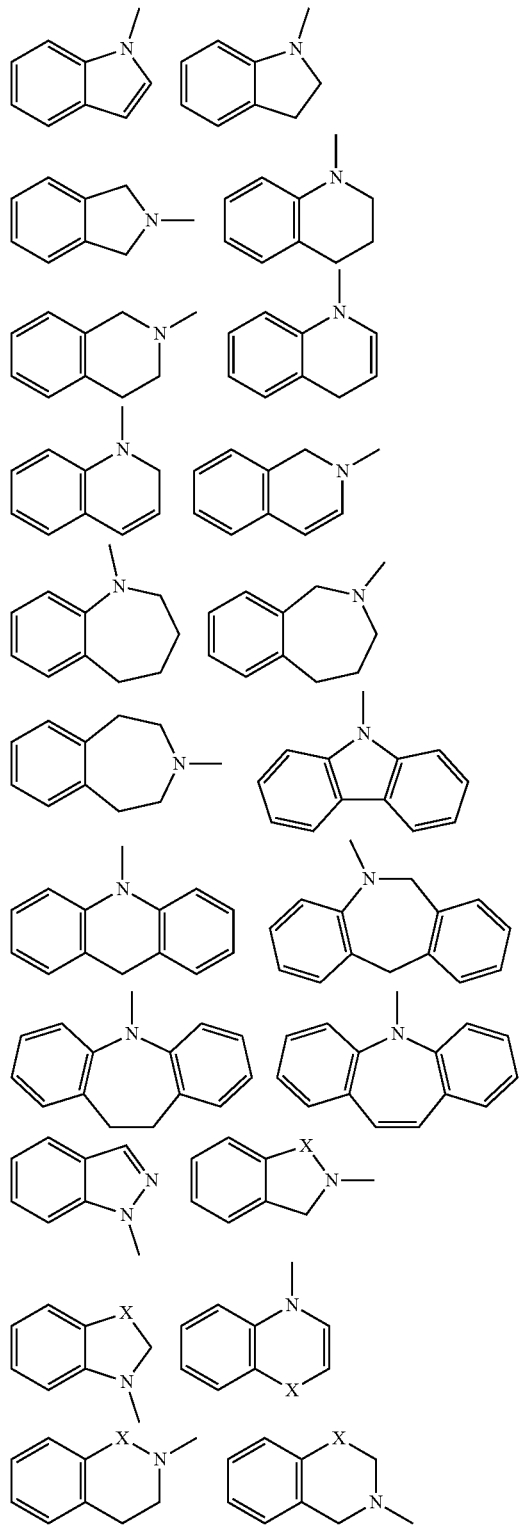

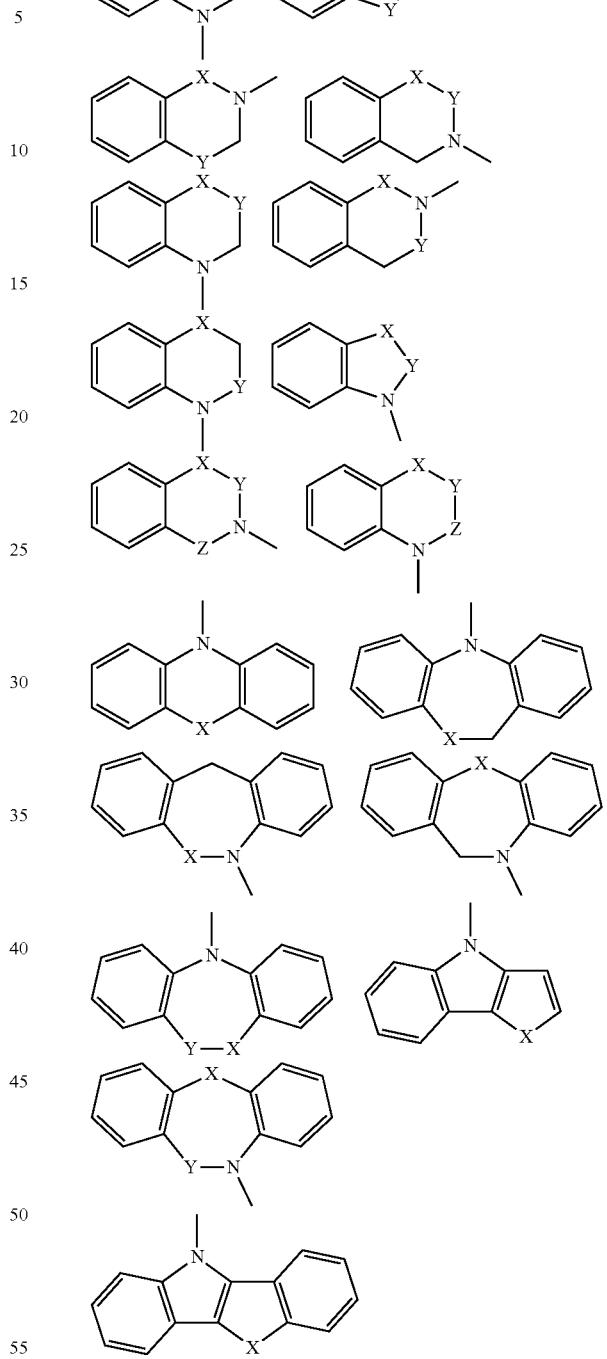

(In the formulae, X, Y, and Z have the same meanings as described above.)

The rings may have a substituent. Examples of the substituent may include those described as the substituent in the aromatic ring of $A^x$.

The total number of π electrons contained in $A^x$ and $A^y$ is preferably 4 or more and 24 or less, more preferably 6 or more and 20 or less, and still more preferably 6 or more and 18 or less from the viewpoint of favorably expressing the desired effect of the present invention.

Examples of preferred combination of $A^x$ and $A^y$ may include the following combinations (α) and (β).

(α) a combination of $A^x$ and $A^y$ in which $A^x$ is an aromatic hydrocarbon ring group of 4 to 30 carbon atoms, an aromatic heterocyclic group of 4 to 30 carbon atoms or a group of 4 to 30 carbon atoms containing a combination of an aromatic hydrocarbon ring and a heterocyclic ring, $A^y$ is a hydrogen atom, a cycloalkyl group of 3 to 8 carbon atoms, an aromatic hydrocarbon ring group of 6 to 12 carbon atoms optionally having a substituent (a halogen atom, a cyano group, an alkyl group of 1 to 6 carbon atoms, an alkoxy group of 1 to 6 carbon atoms, or a cycloalkyl group of 3 to 8 carbon atoms), an aromatic heterocyclic group of 3 to 9 carbon atoms optionally having a substituent (a halogen atom, an alkyl group of 1 to 6 carbon atoms, an alkoxy group of 1 to 6 carbon atoms, or a cyano group), a group of 3 to 9 carbon atoms containing a combination of an aromatic hydrocarbon ring and a heterocyclic ring and optionally having a substituent (a halogen atom, an alkyl group of 1 to 6 carbon atoms, an alkoxy group of 1 to 6 carbon atoms, or a cyano group), an alkyl group of 1 to 20 carbon atoms optionally having a substituent, an alkenyl group of 1 to 20 carbon atoms optionally having a substituent, or an alkynyl group of 2 to 20 carbon atoms optionally having a substituent, and the substituent is any of a halogen atom, a cyano group, an alkoxy group of 1 to 20 carbon atoms, an alkoxy group of 1 to 12 carbon atoms that is substituted by an alkoxy group of 1 to 12 carbon atoms, a phenyl group, a cyclohexyl group, a cyclic ether group of 2 to 12 carbon atoms, an aryloxy group of 6 to 14 carbon atoms, a hydroxyl group, a benzodioxanyl group, a benzenesulfonyl group, a benzoyl group, and $-SR^{10}$.

(β) a combination of $A^x$ and $A^y$ in which $A^x$ and $A^y$ together form an unsaturated heterocyclic ring or an unsaturated carbon ring.

Herein, $R^{10}$ has the same meanings as described above.

Examples of more preferred combination of $A^x$ and $A^y$ may include the following combination (γ).

(γ) a combination of $A^x$ and $A^y$ in which $A^x$ is any of groups having the following structures, $A^y$ is a hydrogen atom, a cycloalkyl group of 3 to 8 carbon atoms, an aromatic hydrocarbon ring group of 6 to 12 carbon atoms optionally having a substituent (a halogen atom, a cyano group, an alkyl group of 1 to 6 carbon atoms, an alkoxy group of 1 to 6 carbon atoms, or a cycloalkyl group of 3 to 8 carbon atoms), an aromatic heterocyclic group of 3 to 9 carbon atoms optionally having a substituent (a halogen atom, an alkyl group of 1 to 6 carbon atoms, an alkoxy group of 1 to 6 carbon atoms, or a cyano group), a group of 3 to 9 carbon atoms containing a combination of an aromatic hydrocarbon ring and a heterocyclic ring and optionally having a substituent (a halogen atom, an alkyl group of 1 to 6 carbon atoms, an alkoxy group of 1 to 6 carbon atoms, or a cyano group), an alkyl group of 1 to 20 carbon atoms optionally having a substituent, an alkenyl group of 1 to 20 carbon atoms optionally having a substituent, or an alkynyl group of 2 to 20 carbon atoms optionally having a substituent, and the substituent is any of a halogen atom, a cyano group, an alkoxy group of 1 to 20 carbon atoms, an alkoxy group of 1 to 12 carbon atoms that is substituted by an alkoxy group of 1 to 12 carbon atoms, a phenyl group, a cyclohexyl group, a cyclic ether group of 2 to 12 carbon atoms, an aryloxy group of 6 to 14 carbon atoms, a hydroxyl group, a benzodioxanyl group, a benzenesulfonyl group, a benzoyl group, and $-SR^{10}$.

Herein, $R^{10}$ has the same meanings as described above.

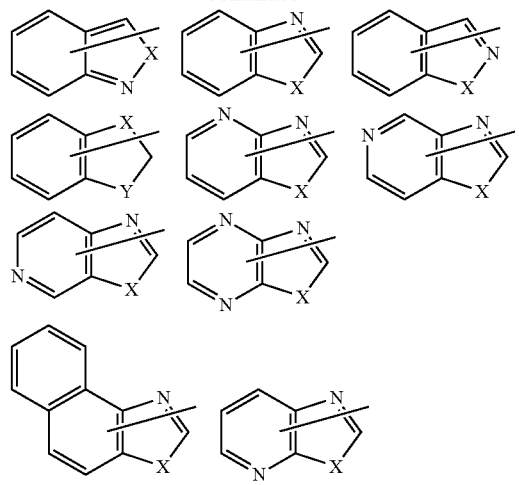

-continued

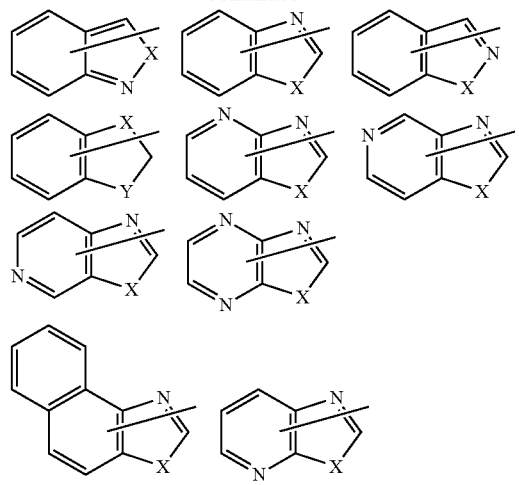

(In the formulae, X and Y have the same meanings as described above.)

Examples of particularly preferred combination of $A^x$ and $A^y$ may include the following combination (δ).

(δ) a combination of $A^x$ and $A^y$ in which $A^x$ is any of groups having the following structures, $A^y$ is a hydrogen atom, a cycloalkyl group of 3 to 8 carbon atoms, an aromatic hydrocarbon ring group of 6 to 12 carbon atoms optionally having a substituent (a halogen atom, a cyano group, an alkyl group of 1 to 6 carbon atoms, an alkoxy group of 1 to 6 carbon atoms, or a cycloalkyl group of 3 to 8 carbon atoms), an aromatic heterocyclic group of 3 to 9 carbon atoms optionally having a substituent (a halogen atom, an alkyl group of 1 to 6 carbon atoms, an alkoxy group of 1 to 6 carbon atoms, or a cyano group), a group of 3 to 9 carbon atoms containing a combination of an aromatic hydrocarbon ring and a heterocyclic ring and optionally having a substituent (a halogen atom, an alkyl group of 1 to 6 carbon atoms, an alkoxy group of 1 to 6 carbon atoms, or a cyano group), an alkyl group of 1 to 20 carbon atoms optionally having a substituent, an alkenyl group of 1 to 20 carbon atoms optionally having a substituent, or an alkynyl group of 2 to 20 carbon atoms optionally having a substituent, and the substituent is any of a halogen atom, a cyano group, an alkoxy group of 1 to 20 carbon atoms, an alkoxy group of 1 to 12 carbon atoms that is substituted by an alkoxy group of 1 to 12 carbon atoms, a phenyl group, a cyclohexyl group, a cyclic ether group of 2 to 12 carbon atoms, an aryloxy group of 6 to 14 carbon atoms, a hydroxyl group, a benzodioxanyl group, a benzenesulfonyl group, a benzoyl group, and $-SR^{10}$.

In the following formulae, X has the same meanings as described above. Herein, $R^{10}$ has the same meanings as described above.

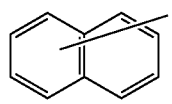 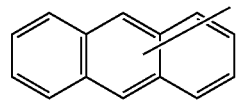 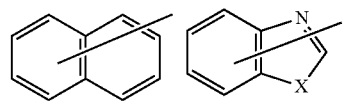

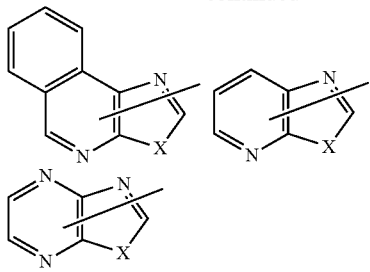

In the formula (I) mentioned above, $A^1$ is a trivalent aromatic group optionally having a substituent. The trivalent aromatic group may be a trivalent carbocyclic aromatic group or a trivalent heterocyclic aromatic group. From the viewpoint of favorably expressing the desired effect of the present invention, the trivalent aromatic group is preferably the trivalent carbocyclic aromatic group, more preferably a trivalent benzene ring group or a trivalent naphthalene ring group, and further preferably a trivalent benzene ring group or a trivalent naphthalene ring group that is represented by the following formula. In the following formulae, substituents $Y^1$ and $Y^2$ are described for the sake of convenience to clearly show a bonding state ($Y^1$ and $Y^2$ have the same meanings as described above, and the same applies to the following).

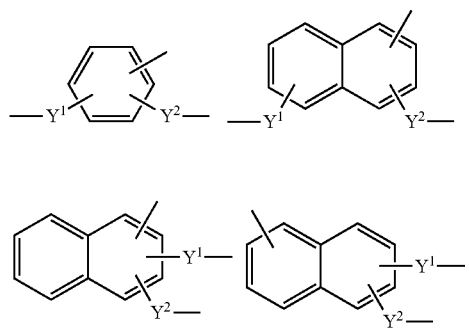

Among these, $A^1$ is more preferably a group represented by each of the following formulae (A11) to (A25), further preferably a group represented by the formula (A11), (A13), (A15), (A19), or (A23), and particularly preferably a group represented by the formula (A11) or (A23).

(A11)
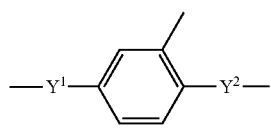

(A12)
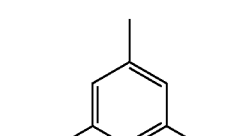

(A13)
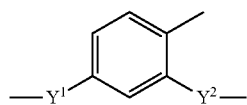

(A14)
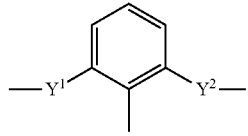

(A15)
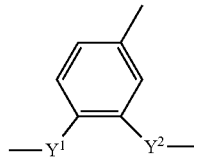

(A16)
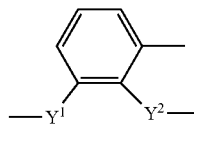

(A17)
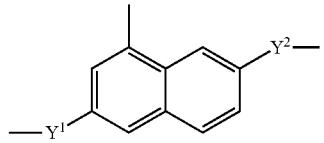

(A18)
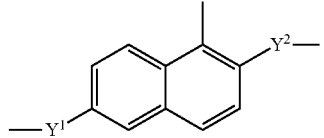

(A19)
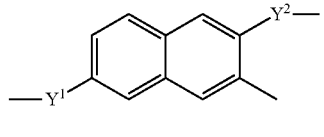

(A20)
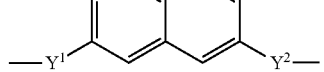

(A21)
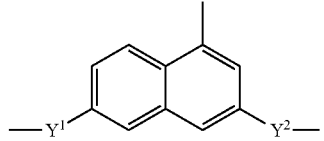

(A22)
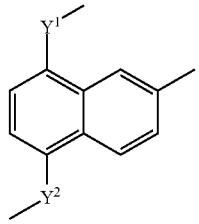

(A23)
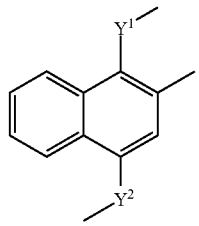

(A24)

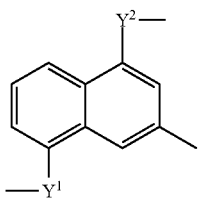

(A25)

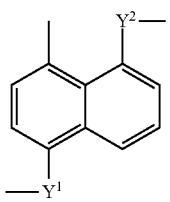

Examples of the substituent that may be included in the trivalent aromatic group of $A^1$ may include those described as the substituent in the aromatic ring of $A^x$ described above. It is preferable that $A^1$ is a trivalent aromatic group having no substituent.

In the formula (I) mentioned above, $A^2$ and $A^3$ are each independently a divalent alicyclic hydrocarbon group of 3 to 30 carbon atoms optionally having a substituent. Examples of the divalent alicyclic hydrocarbon group of 3 to 30 carbon atoms may include a cycloalkanediyl group of 3 to 30 carbon atoms, and a divalent alicyclic fused ring group of 10 to 30 carbon atoms.

Examples of the cycloalkanediyl group of 3 to 30 carbon atoms may include a cyclopropanediyl group; a cyclobutanediyl group, such as a cyclobutane-1,2-diyl group and a cyclobutane-1,3-diyl group; a cyclopentanediyl group, such as a cyclopentane-1,2-diyl group and a cyclopentane-1,3-diyl group; a cyclohexanediyl group, such as a cyclohexane-1,2-diyl group, a cyclohexane-1,3-diyl group, and a cyclohexane-1,4-diyl group; a cycloheptanediyl group, such as a cycloheptane-1,2-diyl group, a cycloheptane-1,3-diyl group, and a cycloheptane-1,4-diyl group; a cyclooctanediyl group, such as a cyclooctane-1,2-diyl group, a cyclooctane-1,3-diyl group, a cyclooctane-1,4-diyl group, and a cyclooctane-1,5-diyl group; a cyclodecanediyl group, such as a cyclodecane-1,2-diyl group, a cyclodecane-1,3-diyl group, a cyclodecane-1,4-diyl group, and a cyclodecane-1,5-diyl group; a cyclododecanediyl group, such as a cyclododecane-1,2-diyl group, a cyclododecane-1,3-diyl group, a cyclododecane-1,4-diyl group, and a cyclododecane-1,5-diyl group; a cyclotetradecanediyl group, such as a cyclotetradecane-1,2-diyl group, a cyclotetradecane-1,3-diyl group, a cyclotetradecane-1,4-diyl group, a cyclotetradecane-1,5-diyl group, and a cyclotetradecane-1,7-diyl group; and a cycloeicosanediyl group, such as a cycloeicosane-1,2-diyl group and a cycloeicosane-1,10-diyl group.

Examples of the divalent alicyclic fused ring group of 10 to 30 carbon atoms may include a decalindiyl group, such as a decalin-2,5-diyl group and a decalin-2,7-diyl group; an adamantanediyl group, such as an adamantane-1,2-diyl group and an adamantane-1,3-diyl group; and a bicyclo[2.2.1]heptanediyl group, such as a bicyclo[2.2.1]heptane-2,3-diyl group, a bicyclo[2.2.1]heptane-2,5-diyl group, and a bicyclo[2.2.1]heptane-2,6-diyl group.

The divalent alicyclic hydrocarbon groups may further have a substituent at any position. Examples of the substituent may include those described as the substituent in the aromatic ring of $A^x$ described above.

Among these, $A^2$ and $A^3$ are preferably a divalent alicyclic hydrocarbon group of 3 to 12 carbon atoms, more preferably a cycloalkanediyl group of 3 to 12 carbon atoms, further preferably a group represented by each of the following formulae (A31) to (A34), and particularly preferably the group represented by the following formula (A32).

(A31)

(A32)

(A33)

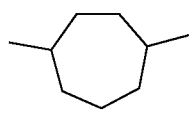

(A34)

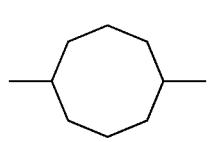

The divalent alicyclic hydrocarbon group of 3 to 30 carbon atoms may exist in forms of cis- and trans-stereoisomers that are on the basis of difference of stereoconfiguration of carbon atoms bonded to $Y^1$ and $Y^3$ (or $Y^2$ and $Y^4$). For example, when the group is a cyclohexane-1,4-diyl group, a cis-isomer (A32a) and a trans-isomer (A32b) may exist, as described below.

(A32a)

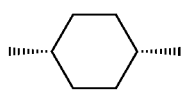

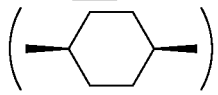

(A32b)

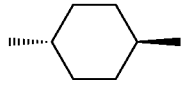

The aforementioned divalent alicyclic hydrocarbon group of 3 to 30 carbon atoms may be a cis-isomer, a trans-isomer, or an isomeric mixture of cis- and trans-isomers. Among these, since the orientation quality is favorable, the group is preferably the trans-isomer or the cis-isomer, and more preferably the trans-isomer.

In the formula (I) mentioned above, $A^4$ and $A^5$ are each independently a divalent aromatic group of 6 to 30 carbon atoms optionally having a substituent. The aromatic group of $A^4$ and $A^5$ may be monocyclic or polycyclic. Specific preferable examples of $A^4$ and $A^5$ are as follows.

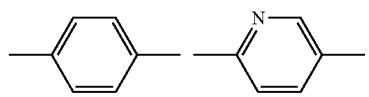

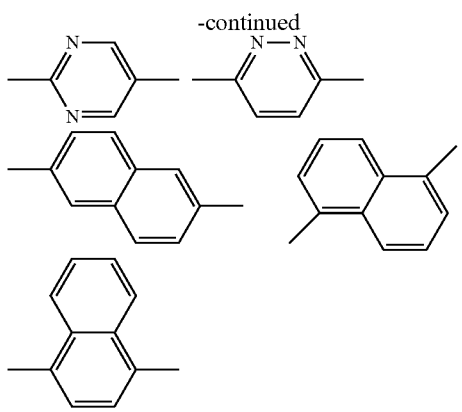

The divalent aromatic groups of $A^4$ and $A^5$ described above may have a substituent at any position. Examples of the substituent may include a halogen atom, a cyano group, a hydroxyl group, an alkyl group of 1 to 6 carbon atoms, an alkoxy group of 1 to 6 carbon atoms, a nitro group, and a —C(=O)—OR$^{8b}$ group. Herein, R$^{8b}$ is an alkyl group of 1 to 6 carbon atoms. In particular, it is preferable that the substituent is a halogen atom, an alkyl group of 1 to 6 carbon atoms, or an alkoxy group of 1 to 6 carbon atoms. Of the halogen atoms, a fluorine atom is more preferable, of the alkyl groups of 1 to 6 carbon atoms, a methyl group, an ethyl group, and a propyl group are more preferable, and of the alkoxy groups, a methoxy group and an ethoxy group are more preferable.

Among these, from the viewpoint of favorably expressing the desired effect of the present invention, $A^4$ and $A^5$ are each independently preferably a group represented by the following formula (A41), (A42), or (A43) and optionally having a substituent, and particularly preferably the group represented by the formula (A41) and optionally having a substituent.

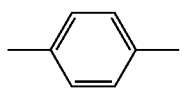   (A41)

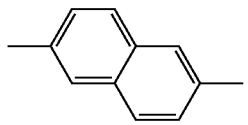   (A42)

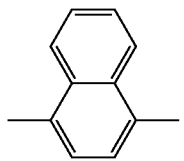   (A43)

In the formula (I) mentioned above, $Q^1$ is a hydrogen atom or an alkyl group of 1 to 6 carbon atoms optionally having a substituent. Examples of the alkyl group of 1 to 6 carbon atoms optionally having a substituent may include the alkyl group of 1 to 6 carbon atoms among the alkyl groups of 1 to 20 carbon atoms optionally having a substituent that are described as $A^y$ described above. Among these, $Q^1$ is preferably a hydrogen atom or an alkyl group of 1 to 6 carbon atoms, and more preferably a hydrogen atom or a methyl group.

In the formula (I) mentioned above, m each independently represents 0 or 1. Among these, m is preferably 1.

The compound (i) may be produced, for example, by a reaction of a hydrazine compound and a carbonyl compound as disclosed in International Publication No. 2012/147904.

[4.3. Photopolymerization Initiator]

The cholesteric liquid crystal material may contain a photopolymerization initiator from the viewpoint of efficiently performing the polymerization reaction.

As the photopolymerization initiator, an appropriate one may be selected for use according to the type of the polymerizable group present in the co-used polymerizable liquid crystal compound. For example, if the polymerizable group is a radical polymerizable group, a radical polymerization initiator may be used. If the polymerizable group is an anionic polymerizable group, an anionic polymerization initiator may be used. If the polymerizable group is a cationic polymerizable group, a cationic polymerization initiator may be used.

As the photopolymerization initiator, known compounds which generate radicals or acids by ultraviolet rays or visible rays may be used. Specifically, examples thereof may include benzoin, benzyl methyl ketal, benzophenone, biacetyl, acetophenone, Michler's ketone, benzyl, benzyl isobutyl ether, tetramethylthiuram mono(di)sulfide, 2,2-azobisisobutyronitrile, 2,2-azobis-2,4-dimethylvaleronitrile, benzoyl peroxide, di-tert-butyl peroxide, 1-hydroxycyclohexyl phenyl ketone, 2-hydroxy-2-methyl-1-phenyl-propane-1-one, 1-(4-isopropylphenyl)-2-hydroxy-2-methylpropane-1-one, thioxanthone, 2-chlorothioxantone, 2-methylthioxantone, 2,4-diethylthioxantone, methylbenzoylformate, 2,2-diethoxyacetophenone, β-ionone, β-bromostyrene, diazoaminobenzene, α-amylcinnamic aldehyde, p-dimethylaminoacetophenone, p-dimethylaminopropiophenone, 2-chlorobenzophenone, pp'-dichlorobenzophenone, pp'-bisdiethylaminobenzophenone, benzoin ethyl ether, benzoin isopropyl ether, benzoin n-propyl ether, benzoin n-butyl ether, diphenyl sulfide, bis(2,6-methoxybenzoyl)-2,4,4-trimethyl-pentylphosphine oxide, 2,4,6-trimethylbenzoyldiphenyl-phosphine oxide, bis(2,4,6-trimethylbenzoyl)-phenylphosphine oxide, 2-methyl-1[4-(methylthio)phenyl]-2-morpholinopropane-1-one, 2-benzyl-2-dimethylamino-1-(4-morpholinophenyl)-butanone-1, anthracene benzophenone, α-chloroanthraquinone, diphenyldisulfide, hexachlorobutadiene, pentachlorobutadiene, octachlorobutene, 1-chloromethylnaphthalene, 1,2-octanedione, a carbazole oxime compound such as 1-[4-(phenylthio)-,2-(o-benzoyloxime)] and 1-[9-ethyl-6-(2-methylbenzoyl)-9H-carbazol-3-yl]ethanone 1-(o-acetyloxime), (4-methylphenyl)[4-(2-methylpropyl)phenyl]iodonium hexafluorophosphate, 3-methyl-2-butynyltetramethylsulfonium hexafluoroantimonate, and diphenyl-(p-phenylthiophenyl)sulfonium hexafluoroantimonate. Two or more types of compounds may be mixed according to desired properties, and a known photosensitizer or a tertiary amine compound as a polymerization accelerator may be added if necessary to control the curability.

Specific examples of the photoradical polymerization initiator may include trade name Irgacure 907, trade name Irgacure 184, trade name Irgacure 369, trade name Irgacure 651, trade name Irgacure OXE02, and the like manufactured by Chiba Specialty Chemicals Corporation.

Examples of the anionic polymerization initiator may include an alkyllithium compound; a monolithium salt and a monosodium salt of biphenyl, naphthalene, pyrene and the like; and a multifunctional initiator such as a di-lithium salt and a tri-lithium salt.

Examples of the cationic polymerization initiator may include a protonic acid such as sulfuric acid, phosphoric acid, perchloric acid, and trifluoromethanesulfonic acid; a Lewis acid such as boron trifluoride, aluminum chloride, titanium tetrachloride, and tin tetrachloride; an aromatic onium salt and a combination system of an aromatic onium salt and a reducing agent.

As these polymerization initiators, one type thereof may be solely used, and two or more types thereof may also be used in combination at any ratio.

In order to perform (co)polymerization of the polymerizable liquid crystal compound and other copolymerizable monomers and the like that are used if necessary, the cholesteric liquid crystal material may contain a functional compound such as an ultraviolet absorber, an infrared absorber, and an antioxidant, if necessary.

The mixing ratio of the photopolymerization initiator in the cholesteric liquid crystal material is usually 0.03 to 7 parts by weight relative to 100 parts by weight of the cholesteric liquid crystal compound.

[4.4. Other Components of Cholesteric Liquid Crystal Material]

The cholesteric liquid crystal material may contain a surfactant to adjust the surface tension thereof. The surfactant is not particularly limited, but usually a nonionic surfactant is preferable. Commercial products are available as the nonionic surfactant. Examples thereof may include a nonionic surfactant which is an oligomer having a molecular weight of about several thousands, for example, KH-40 manufactured by Seimi Chemical Co., Ltd. When the cholesteric liquid crystal material contains the cholesteric liquid crystal compound and the surfactant, the mixing ratio of the surfactant is usually 0.01 to 10 parts by weight, and preferably 0.1 to 2 parts by weight, relative to 100 parts by weight of the cholesteric liquid crystal compound.

The cholesteric liquid crystal material may contain, in addition to the above-described components, any additive such as a metal, a metal complex, a dye, a pigment, a fluorescent material, a phosphorescent material, a leveling agent, a thixotropic agent, a gelling agent, a polysaccharide, an ultraviolet absorber, an infrared absorber, an antioxidant, an ion exchange resin, and a metal oxide such as titanium oxide.

EXAMPLES

Example 1

(1-1. Preparation of Cholesteric Liquid Crystal Material)

100 parts of a polymerizable liquid crystal compound represented by the following formula (1) (produced by a method described in International Publication No. 2009/41512), 6 parts of a polymerizable chiral compound ("LC756" manufactured by BASF Corp.), 4 parts of a photopolymerization initiator ("IRGACURE 379G" manufactured by BASF Corp.), 0.2 part of a surfactant ("MEGAFACE F470" manufactured by DIC Corp.), and 150 parts of cyclopentanone as a solvent were mixed to obtain a cholesteric liquid crystal material.

(1-2. Cholesteric Resin Capsule)

0.08 g of a surfactant (sodium dodecylbenzenesulfonate) was added to 80 g of an aqueous solution containing 5 wt. % gelatin (product name "Gelatin NEW silver granule" manufactured by Chubu Bussan Boeki Co., Ltd.) to thereby prepare a dispersion medium. 1 g of the cholesteric liquid crystal material obtained in (1-1) was added to this dispersion medium to obtain a mixture. The mixture was stirred at 500 rpm at 50° C. for 10 minutes using a mixer (product name "Polytron homogenizer PT10-35GT" manufactured by Central Scientific Commerce, Inc.). After finishing the stirring, 152 g of ethylene glycol was added to the mixture and the resulting mixture was heated to 120° C. to increase a temperature. As a result, particles in the mixture exhibited a green color.

The mixture was irradiated with ultraviolet rays of 1,000 mJ/cm$^2$, to thereby cure the cholesteric liquid crystal material in the particles. In this manner, cholesteric resin capsules were formed in the mixture.

The mixture was filtered to collect the cholesteric resin capsules in the mixture. The cholesteric resin capsules collected by filtration were dried at 80° C. In this manner, cholesteric resin capsules having a number-average particle diameter of 4 μm were obtained. The cholesteric resin capsules thus obtained had a selective reflection band of 520 to 600 nm and a half width of the selective reflection band of 80 nm.

(1-3. Display Medium)

A corona treatment was performed on one surface of a resin film containing an alicyclic structure-containing polymer (product name "ZEONORFILM ZF16-100" manufactured by ZEON Corporation, a thickness of 100 μm) to prepare a film as a printing object.

The cholesteric resin capsules obtained in (1-2) were added to a transparent ink (product name "Aqua@VCM reducer" manufactured by Toyo Ink Co., Ltd.) to prepare a capsule-containing ink. The ratio of the cholesteric resin capsules in the capsule-containing ink was set to 20% by weight.

A gravure printer having a plate of 100 lines was prepared. The capsule-containing ink was charged into the gravure printer and an idle operation of the gravure printer was performed for 1 hour. The term "idle operation" means that the gravure printer is operated for performing a printing operation without supplying a film as a printing object. Thus, the ink remains attached to the plate.

After a lapse of an idle operation time, the film as a printing object was supplied to the gravure printer to perform printing using the capsule-containing ink. By such printing, a belt shaped display layer of 200 mm width and 10 μm thickness containing the cholesteric resin capsules was formed on the surface of the film. In this manner, a display medium including the film and the display layer was obtained.

(1)

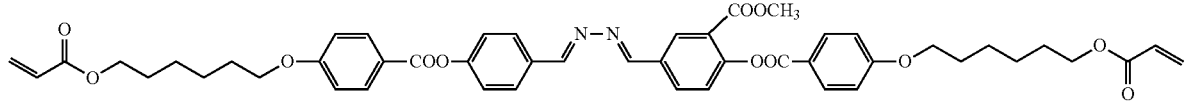

The display layer exhibited a green color tone when observed under lighting of a white fluorescent lamp. A 100 mm×100 mm rectangular region in a central part of the obtained display layer was visually observed through a magnifier. As a result, faulty printing caused by clogging of the plate was not found.

Further, the display layer was observed through a clockwise circularly polarized plate and a counterclockwise circularly polarized plate. As the clockwise circularly polarized plate, MCPR-4 (manufactured by MeCan Imaging Inc.) was used, and, as the counterclockwise circularly polarized plate, MCPL-4 (manufactured by MeCan Imaging Inc.) was used (the same hereinafter). As a result, the display layer was observed as a black color layer through the clockwise circularly polarized plate, while it was observed as a green color layer through the counterclockwise circularly polarized plate.

Example 2

(2-1. Preparation of Cholesteric Liquid Crystal Material)
1 part of a polymerizable liquid crystal compound represented by the following formula (2) (a refractive index anisotropy Δn of 0.07, a phase transition temperature from a liquid crystal phase to an isotropic phase of 200° C. or higher, a phase transition temperature from a crystal phase to a liquid crystal phase of 102° C.), 0.13 part of a chiral agent ("LC756" manufactured by BASF Corp.), 0.035 part of a photopolymerization initiator ("IRGACURE 379" manufactured by BASF Corp.), and 0.0013 part of a surfactant ("s242" manufactured by AGC Seimi Chemical Co., Ltd.), and 1.5 parts of cyclopentanone as a solvent were mixed to obtain a liquid crystal composition.

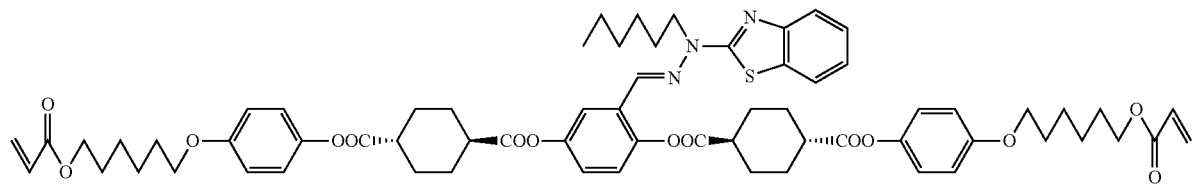

(2)

(2-2. Cholesteric Resin Capsule)
0.08 g of a surfactant (sodium dodecylbenzenesulfonate) was added to 80 g of an aqueous solution containing 5 wt. % gelatin (product name "Gelatin NEW silver granule" manufactured by Chubu Bussan Boeki Co., Ltd.) to prepare a dispersion medium. 1 g of the cholesteric liquid crystal material obtained in (2-1) was added to this dispersion medium to obtain a mixture. The mixture was stirred at 500 rpm at 50° C. for 10 minutes using a mixer (product name "Polytron homogenizer PT10-35GT" manufactured by Central Scientific Commerce, Inc.). After finishing the stirring, the mixture was heated to 85° C. As a result, particles in the mixture exhibited a green color.

The mixture was irradiated with ultraviolet rays of 1,000 mJ/cm², to thereby cure the cholesteric liquid crystal material in the particles. In this manner, cholesteric resin capsules were formed in the mixture.

The mixture was filtered to collect the cholesteric resin capsules in the mixture. The cholesteric resin capsules collected by filtration were dried at 80° C. In this manner, cholesteric resin capsules having a number-average particle diameter of 4 μm was obtained. The cholesteric resin capsules thus obtained had a selective reflection band of 540 to 580 nm and a half width of the selective reflection band of 40 nm.

(2-3. Display Medium)
A display medium was obtained and evaluated by the same operations as those in (1-3) of Example 1 except for the following change.

The cholesteric resin capsules obtained in (2-2) were used instead of the cholesteric resin capsules obtained in (1-2) of Example 1.

The display layer of the display medium thus obtained exhibited a green color tone when observed under lighting of a white fluorescent lamp. Faulty printing caused by clogging of the plate was not found. The display layer was observed as a black color layer through the clockwise circularly polarized plate, while it was observed as a green color layer through the counterclockwise circularly polarized plate.

Example 3

Cholesteric resin capsules and a display medium were obtained and evaluated by the same operations as those in Example 1 except for the following changes.

In (1-2) of Example 1, 80 g of an aqueous solution containing 10 wt. % polyvinyl alcohol (product name "PVA 363170" manufactured by Sigma-Aldrich Inc.) was used instead of using 80 g of the aqueous solution containing 5 wt. % gelatin. Further, an adding amount of ethylene glycol was changed to 144 g.

The cholesteric resin capsules thus obtained had a number-average particle diameter of 5 μm. The cholesteric resin capsules thus obtained had a selective reflection band of 520 to 600 nm and a half width of the selective reflection band of 80 nm.

The display layer of the display medium thus obtained exhibited a green color tone when observed under lighting of a white fluorescent lamp. Faulty printing caused by clogging of the plate was not found. The display layer was observed as a black color layer through the clockwise circularly polarized plate, while it was observed as a green color layer through the counterclockwise circularly polarized plate.

Example 4

(4-1. Cholesteric Resin Capsule)
0.08 g of a surfactant (sodium dodecylbenzenesulfonate) was added to 80 g of an aqueous solution containing 10 wt. % polyvinyl alcohol (product name "PVA 363170" manufactured by Sigma-Aldrich Inc.) to prepare a dispersion medium. 1 g of the cholesteric liquid crystal material obtained in (1-1) of Example 1 was added to the dispersion medium to obtain a mixture. The mixture was stirred at 500 rpm at 50° C. for 10 minutes using a mixer (product name "Polytron homogenizer PT10-35GT" manufactured by Central Scientific Commerce, Inc.). After finishing the stirring, the mixture was heated to 100° C. and irradiated with ultraviolet rays of 100 mJ/cm$^2$. Subsequently, 152 g of ethylene glycol was added to the mixture and the resulting mixture was heated to 120° C. The mixture was irradiated with ultraviolet rays of 1,000 mJ/cm$^2$ to thereby cure the cholesteric liquid crystal material in the particles. In this manner, cholesteric resin capsules were formed in the mixture.

The mixture was filtered to collect the cholesteric resin capsules in the mixture. The cholesteric resin capsules collected by filtration were dried at 80° C. In this manner, the cholesteric resin capsules having a number-average particle diameter of 5 µm were obtained. The cholesteric resin capsules thus obtained had a selective reflection band of 400 to 800 nm and a half width of the selective reflection band of 400 nm.

(4-2. Display Medium)

A display medium was obtained and evaluated by the same operations as those in (1-3) of Example 1 except for the following change.

The cholesteric resin capsules obtained in (4-1) were used instead of the cholesteric resin capsules obtained in (1-2) of Example 1.

The display layer of the display medium thus obtained exhibited a silver color tone when observed under lighting of a white fluorescent lamp. Faulty printing caused by clogging of the plate was not found. The display layer was observed as a black color layer through the clockwise circularly polarized plate, while it was observed as a silver color layer through the counterclockwise circularly polarized plate.

Example 5

(5-1. Cholesteric Resin Capsule)

Cholesteric resin capsules were obtained by the same operations as those in (2-1) and (2-2) of Example 2 except for the following change.

In (2-2) of Example 2, 80 g of an aqueous solution containing 10 wt. % polyvinyl alcohol (product name "PVA 363170" manufactured by Sigma-Aldrich Inc.) was used instead of 80 g of the aqueous solution containing 5 wt. % gelatin.

The cholesteric resin capsules thus obtained had a number-average particle diameter of 5 µm. The cholesteric resin capsules thus obtained had a selective reflection band of 540 to 580 nm and a half width of the selective reflection band of 40 nm.

(5-2. Display Medium)

A display medium was obtained and evaluated by the same operations as those in (1-3) of Example 1 except for the following change.

The cholesteric resin capsules obtained in (5-1) were used instead of using the cholesteric resin capsules obtained in (1-2) of Example 1.

The display layer of the display medium thus obtained exhibited a green color tone when observed under lighting of a white fluorescent lamp. Faulty printing caused by clogging of the plate was not found. The display layer was observed as a black color layer through the clockwise circularly polarized plate, while it was observed as a green color layer through the counterclockwise circularly polarized plate.

Example 6

A corona treatment was performed on one surface of a resin film containing an alicyclic structure-containing polymer (product name "ZEONORFILM ZF16-100" manufactured by ZEON Corporation, a thickness of 100 µm) to prepare a film as a printing object.

The cholesteric resin capsules obtained in (4-1) of Example 4 were added to a transparent ink (product name "Aqua@VCM reducer" manufactured by Toyo Ink Co., Ltd.) to prepare a capsule-containing ink. The ratio of the cholesteric resin capsules in the capsule-containing ink was set to 40% by weight. The cholesteric resin capsules thus obtained had a selective reflection band of 400 to 800 nm and a half width of the selective reflection band of 400 nm.

A gravure printer having a plate of 100 lines was prepared. The capsule-containing ink was charged into the gravure printer and a film as a printing object was supplied to the gravure printer to perform printing using the capsule-containing ink. By such printing, a belt shaped display layer (A) of 100 mm width and 10 µm thickness containing the cholesteric resin capsules was formed on the surface of the film.

Display layers (B) containing metal particles were formed on both side portions of the belt shaped display layer (A) by inkjet printing. As an ink for forming the display layer (B), a commercial product under the name of "Drycure AG-JB 0420B" (manufactured by C-Ink Co., Ltd.) was used. In this manner, a display medium including the film, the display layer (A), and the display layers (B) was obtained.

Both the display layer (A) and the display layers (B) exhibited a silver color tone when observed under lighting of a white fluorescent lamp.

Further, the display layers were observed through a clockwise circularly polarized plate and a counterclockwise circularly polarized plate. As a result, the display layer (A) was observed as a black color layer and the display layers (B) were observed as silver color layers through the clockwise circularly polarized plate. Both the display layer (A) and the display layers (B) were observed as silver color layers through the counterclockwise circularly polarized plate.

Example 7

The cholesteric resin capsules obtained in (5-1) of Example 5 were added to a transparent ink (product name "Aqua@VCM reducer" manufactured by Toyo Ink Co., Ltd.) to prepare a capsule-containing ink. The ratio of the cholesteric resin capsules in the capsule-containing ink was set to 40% by weight.

The capsule-containing ink thus obtained was used to print characters "zeon" by screen printing on the display layers (A) and (B) of the display medium obtained in Example 6, thereby forming display layers (C) in the shape of such characters. In this manner, a display medium including the display layers (A) and (B), and the display layers (C) that cover parts of the layers (A) and (B) was obtained.

Both the display layer (A) and the display layers (B) exhibited a silver color tone when observed under lighting of a white fluorescent lamp. The display layers (C) exhibited a green color tone when observed under lighting of a white fluorescent lamp.

Further, the display layers were observed through a clockwise circularly polarized plate and a counterclockwise circularly polarized plate. As a result, the display layer (A) was observed as a black color layer, the display layers (B) were observed as silver color layers, and the display layers (C) were observed as black color layers through the clockwise circularly polarized plate. Both the display layer (A) and the display layers (B) were observed as silver color layers, and the display layers (C) were observed as green color layers through the counterclockwise circularly polarized plate.

REFERENCE SIGN LIST

101: container
102: heating device
103: light source
111: dispersion medium
112: droplet
200: display medium
212: droplet-cured products
231: substrate
231U: upper surface of substrate
300: display medium
313: particle other than droplet-cured products
400: display medium
R21: display layer
R31: display layer
R41: display layer
R42: display layer

The invention claimed is:

1. A display medium comprising a display layer for authenticity identification, wherein
the display layer contains a droplet-cured product and a metal particle,
the droplet-cured product contains a resin having a cholesteric liquid crystal material subjected to a band widening process, and
a half width of a selective reflection band within a visible wavelength region of the droplet-cured product is greater than 100 nm.

2. The display medium according to claim 1, wherein
the display layer is a cured product of a coating material containing the droplet-cured product.

3. The display medium according to claim 1, wherein
the display layer contains plural types of droplet-cured products exhibiting different color tones as the droplet-cured product.

4. A method for producing the display medium of claim 1, comprising:
a step of preparing a dispersion liquid containing a dispersion medium and droplets of a liquid crystal material dispersed in the dispersion medium, the liquid crystal material containing a cholesteric liquid crystal material;
a step of adjusting a temperature of the dispersion liquid to thereby adjust a color tone of the liquid crystal material in the droplets to a desired color tone;
a step of curing the liquid crystal material in the dispersion liquid while in a state of exhibiting the desired color tone using a band widening process to thereby obtain a droplet-cured product; and
a step of disposing the droplet-cured product on a surface of a substrate to form a display layer.

5. The display medium according to claim 1, wherein
the metal particle is a particle exhibiting a silver color tone.

6. The display medium according to claim 1, wherein
the display medium comprises a first display layer and a second display layer as the display layers,
the first display layer and the second display layer are disposed in adjacent separate regions,
the first display layer contains the droplet-cured product, and
the second display layer contains the metal particle.

* * * * *